US012249231B2

United States Patent
Sol

(10) Patent No.: US 12,249,231 B2
(45) Date of Patent: *Mar. 11, 2025

(54) ALARM SYSTEM FOR FACILITATING PARTIAL ALARM SYSTEM DISABLING DURING TEMPORARY PREMISES ACCESS

(71) Applicant: Tyco Fire & Security GmbH, Neuhausen am Rheinfall (CH)

(72) Inventor: Martin Sol, Richmond Hill (CA)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 56 days.

This patent is subject to a terminal disclaimer.

(21) Appl. No.: 17/883,387

(22) Filed: Aug. 8, 2022

(65) Prior Publication Data

US 2022/0383726 A1 Dec. 1, 2022

Related U.S. Application Data

(63) Continuation of application No. 17/010,598, filed on Sep. 2, 2020, now Pat. No. 11,417,196, which is a continuation of application No. 16/736,445, filed on Jan. 7, 2020, now Pat. No. 10,818,159, which is a continuation of application No. 15/941,048, filed on Mar. 30, 2018, now Pat. No. 10,565,856.

(51) Int. Cl.

*G08B 23/00* (2006.01)
*G07C 9/00* (2020.01)
*G08B 13/196* (2006.01)
*G08B 25/00* (2006.01)

(52) U.S. Cl.

CPC ....... *G08B 25/008* (2013.01); *G07C 9/00174* (2013.01); *G08B 13/19689* (2013.01)

(58) Field of Classification Search

CPC ............ G08B 25/008; G08B 13/19689; G07C 9/00174

USPC ...................... 340/501, 540, 541, 542, 568.1

See application file for complete search history.

(56) References Cited

U.S. PATENT DOCUMENTS

| | | | | |
|---|---|---|---|---|
| 9,922,513 | B1 * | 3/2018 | Hall | G07C 9/00896 |
| 10,147,249 | B1 * | 12/2018 | Brady | G07C 9/00571 |
| 10,565,856 | B2 * | 2/2020 | Sol | G07C 9/00174 |
| 2007/0193834 | A1 * | 8/2007 | Pai | G06Q 10/08 186/3 |

(Continued)

*Primary Examiner* — Anh V La

(74) *Attorney, Agent, or Firm* — ArentFox Schiff LLP

(57) ABSTRACT

Alarm system arrangements (e.g., methods, apparatus, etc.) including receiving data originating from an entity located outside of a monitored premise, the data providing information detailing an impending request for temporary access of the monitored premise; and using the data to determine a predefined access plan to allow the temporary access to a predefined sub-area of the premises without triggering an alarm event, and to implement the predefined access plan at a time of receipt of an actual request for the temporary access. One example involves using the data to determine a predefined access plan which includes temporarily disabling of the alarm system's ability to recognize an alarm event with respect to activities occurring with respect to a predefined sub-area of the premises during the temporary access, and to implement the predefined access plan at a time relative to receipt of an actual request for the temporary access.

15 Claims, 10 Drawing Sheets

(56) References Cited

U.S. PATENT DOCUMENTS

| | | | | |
|---|---|---|---|---|
| 2017/0103647 | A1* | 4/2017 | Davis .................. | H04W 12/068 |
| 2018/0005143 | A1* | 1/2018 | Camargo .............. | H04W 12/06 |

* cited by examiner

FIG. 7

DELIVERY COMPANY SERVER DATABASE

700

| | 701 | 702 | 703 | 704 | 705 | 706 | 707 |
|---|---|---|---|---|---|---|---|
| 751 | **Delivery#** | **ShipCo** | **DeliveryAddr** | **DeliveryCity** | **DeliveryState** | **RecipientName** | **RecipientEmail** |
| 752 | ••• | ••• | ••• | ••• | ••• | ••• | ••• |
| 753 | 0009843 | ABC Co. | 123 Main St. | Anywhere | NY | John Doe | Jdoe@email.com |
| 754 | 0009844 | DEF Co. | 116 Main St. | Anywhere | MA | Jane Doe | Jndoe@email.com |
| 755 | ••• | ••• | ••• | ••• | ••• | ••• | ••• |
| 756 | ••• | ••• | ••• | ••• | ••• | ••• | ••• |

| 708 | 709 | 710 | 711 | 712 | 713 | 714 | 715 |
|---|---|---|---|---|---|---|---|
| **RecipientCell** | **DelivStatus** | **EstDelivDate** | **EstDelivWindow** | **ActDelivDate** | **#DelivItems** | **EstLengthAcc** | ••• |
| ••• | ••• | ••• | ••• | ••• | ••• | ••• | ••• |
| (555) 555-1234 | Pending | 20180220 | 0900-1200 | | 1 | 0005 | ••• |
| (555) 555-2345 | Complete | 20180126 | 1300-1500 | 20180126 | 39 | 0020 | ••• |
| ••• | ••• | ••• | ••• | ••• | ••• | ••• | ••• |
| ••• | ••• | ••• | ••• | ••• | ••• | ••• | ••• |

FIG. 8

ALARM COMPANY SERVER DATABASE

800

| | 801 | 802 | 803 | 804 | 805 | 806 | 807 | 808 | 809 | 810 |
|---|---|---|---|---|---|---|---|---|---|---|
| 851 | **PanelSN** | **PanelIPAddr** | **PanelAddr** | **PanelCity** | **PanelState** | **PanelCustomer** | **PanelCustEmail** | **#PanelCustCell** | **ZoneAccess?** | ••• |
| 852 | ••• | ••• | ••• | ••• | ••• | ••• | ••• | ••• | ••• | ••• |
| 853 | 81764 | 127.242.0.19 | 123 Main St. | Anywhere | NY | John Doe | Jdoe@emailcom | (555) 555-1234 | Allowed | ••• |
| 854 | 72229 | 127.341.0.20 | 123 Broadway Ave. | Anywhere | NY | Jane Doe | Jndoe@email.com | (555) 555-2345 | Not Allowed | ••• |
| 855 | ••• | ••• | ••• | ••• | ••• | ••• | ••• | ••• | ••• | ••• |
| 856 | ••• | ••• | ••• | ••• | ••• | ••• | ••• | ••• | ••• | ••• |
| 857 | ••• | ••• | ••• | ••• | ••• | ••• | ••• | ••• | ••• | ••• |

FIG. 9

ALARM PANEL DELIVERY DATABASE

900

| | 901 | 902 | 903 | 904 | 905 | 906 |
|---|---|---|---|---|---|---|
| 951 | **DelivCoID** | **Delivery#** | **ShipCo** | **DelivStatus** | **EstDelivDate** | **EstDelivWindow** |
| 952 | XYZ Courier | 000451 | 123 Co. | Expired | 20171217 | 1400-1600 |
| 953 | ABC Courier | 010079 | XYZ Co. | Complete | 20180126 | 1300-1500 |
| 954 | 123 Courier | 0009843 | ABC Co. | Pending | 20180220 | 0900-1200 |

| | 907 | 908 | 909 | 910 |
|---|---|---|---|---|
| | **#DelivItems** | **EstLengthAcc** | **MaxLengthAcc** | ••• |
| 1 | | 0500 | 0015 | ••• |
| | 39 | 0020 | 0023 | ••• |
| 1 | | 0005 | 0007 | ••• |

1000

1050

1100

1200

1300

ALARM SYSTEM FOR FACILITATING PARTIAL ALARM SYSTEM DISABLING DURING TEMPORARY PREMISES ACCESS

CROSS REFERENCE TO RELATED APPLICATIONS

This application is a continuation of U.S. application Ser. No. 17/010,598, entitled "ALARM SYSTEM FOR FACILITATING PARTIAL ALARM SYSTEM DISABLING DURING TEMPORARY PREMISES ACCESS" and filed Sep. 2, 2020, which is a continuation of U.S. application Ser. No. 16/736,445, entitled "ALARM SYSTEM FOR FACILITATING PARTIAL ALARM SYSTEM DISABLING DURING TEMPORARY PREMISES ACCESS" and filed Jan. 7, 2020, now U.S. Pat. No. 10,818,159, which is a continuation of U.S. application Ser. No. 15/941,048, entitled "ALARM SYSTEM FOR FACILITATING PARTIAL ALARM SYSTEM DISABLING DURING TEMPORARY PREMISES ACCESS" and filed Mar. 30, 2018, now U.S. Pat. No. 10,565,856, the entirety of all of which is expressly incorporated herein by reference.

FIELD OF THE DISCLOSURE

The disclosure relates generally to the field of alarm systems, and more particularly to alarm system arrangements (methods, apparatus (e.g., alarm panel), etc) for facilitating partial alarm system disabling during temporary premises access, such as access for package deliveries.

BACKGROUND OF THE DISCLOSURE

Alarm systems, such as security (intrusion) and fire alarm systems, typically include one or more alarm panels (as alarm system controllers) to receive information from various sensors and to control various appliances distributed through a structured (or monitored) area such as a premises. For example, a security system may include a plurality of initiating devices (e.g., door and window contact switches, motion detectors, video motion detectors, glass breakage detectors, smoke/fire detectors, etc.), notification appliances (e.g., strobes, sirens, public announcement systems, etc.), and capture appliances (e.g., video cameras), all operably connected to one or more alarm panels. A fire alarm system may have somewhat differing initiating devices (e.g., smoke detectors, manually-actuated pull stations, carbon-monoxide detectors, etc.), During operation of the alarm system, the alarm panel may monitor electrical signals associated with the initiating (e.g., "point") devices for variations that may signal the occurrence of an alarm condition. For example, a variation in a particular electrical signal may represent the detection of smoke by a smoke detector in a corresponding area, or "zone," of a structure in which the smoke detector is located, and may cause the alarm panel to enter an alarm mode and issue an alarm notification as an alarm event. The alarm panel may be configured to respond to such a condition by initiating certain predefined actions, such as activating one or more of the notification appliances within the monitored structure.

The alarm panel may also be configured to forward alarm data to a central monitoring station (CMS) of an alarm monitoring company or service. Data outputted by the alarm panel toward the central monitoring station may include alarm data (e.g., concerning fire, smoke, intrusion, chemical, biohazard, panic and medical incidents).

While alarm systems and alarm panels are good at monitoring premises and providing alarm notifications, there has arisen a need to allow authorized personnel to obtain temporary (transient) access into monitored premises without triggering an alarm event (i.e., notification). As one example, there has arisen a need to allow authorized delivery personnel brief access into monitored premises for the purpose of placing delivery item(s) within the premises to secure against that or to protect the item(s) against weather elements (e.g., rain). Given the increasing consumer trend toward utilizing on-line purchasing and at-home delivery, and the increasing criminal trend toward intercepting and stealing at-home delivery items, there is an ever increasing need to allow authorized personnel (e.g., delivery persons) temporary access to the premises.

Such need is not limited only to delivery. As another example, a shipping or courier company may have a need to pick up a shipping item secured within a premises. As another example, it may be convenient to allow authorized service personnel (e.g., repairmen) into a monitored business place for the purpose of servicing a malfunctioning apparatus. For example, allow a heating/ventilation/air-conditioning (HVAC) technician into a mechanical room to service a malfunctioning AC apparatus.

For convenience of discussion, a home delivery example will be used to provide a description of one example embodiment of the invention. However, the above home delivery and above other access examples are non-exhaustive and non-limiting, in that there are hundreds if not thousands of other situations where it might be convenient to allow authorized personnel temporary access to monitored premises without triggering an alarm event.

SUMMARY

In view of the forgoing, disclosed are arrangements (methods, apparatus, etc.) which provide the ability to allow authorized personnel temporary (transient) access into monitored premises without triggering an alarm event.

In one embodiment, an alarm system controller includes an interface connectable to receive data originating from an entity located outside of monitored premises. The data provides information detailing an impending request for temporary access of the monitored premises. An access module is configured to use the data to determine a predefined access plan to allow the temporary access to a predefined sub-area of the premises without triggering an alarm event, and to implement the predefined access plan at a time of receipt of an actual request for the temporary access.

BRIEF DESCRIPTION OF THE DRAWINGS

By way of example, specific embodiments of the disclosed arrangements will now be described, with reference to the accompanying drawings, in which:

FIG. 7-9 each illustrate a portion of an example database containing example data related to the ability to allow authorized personnel temporary access into monitored premises without triggering an alarm event.

DETAILED DESCRIPTION

Figure 1:
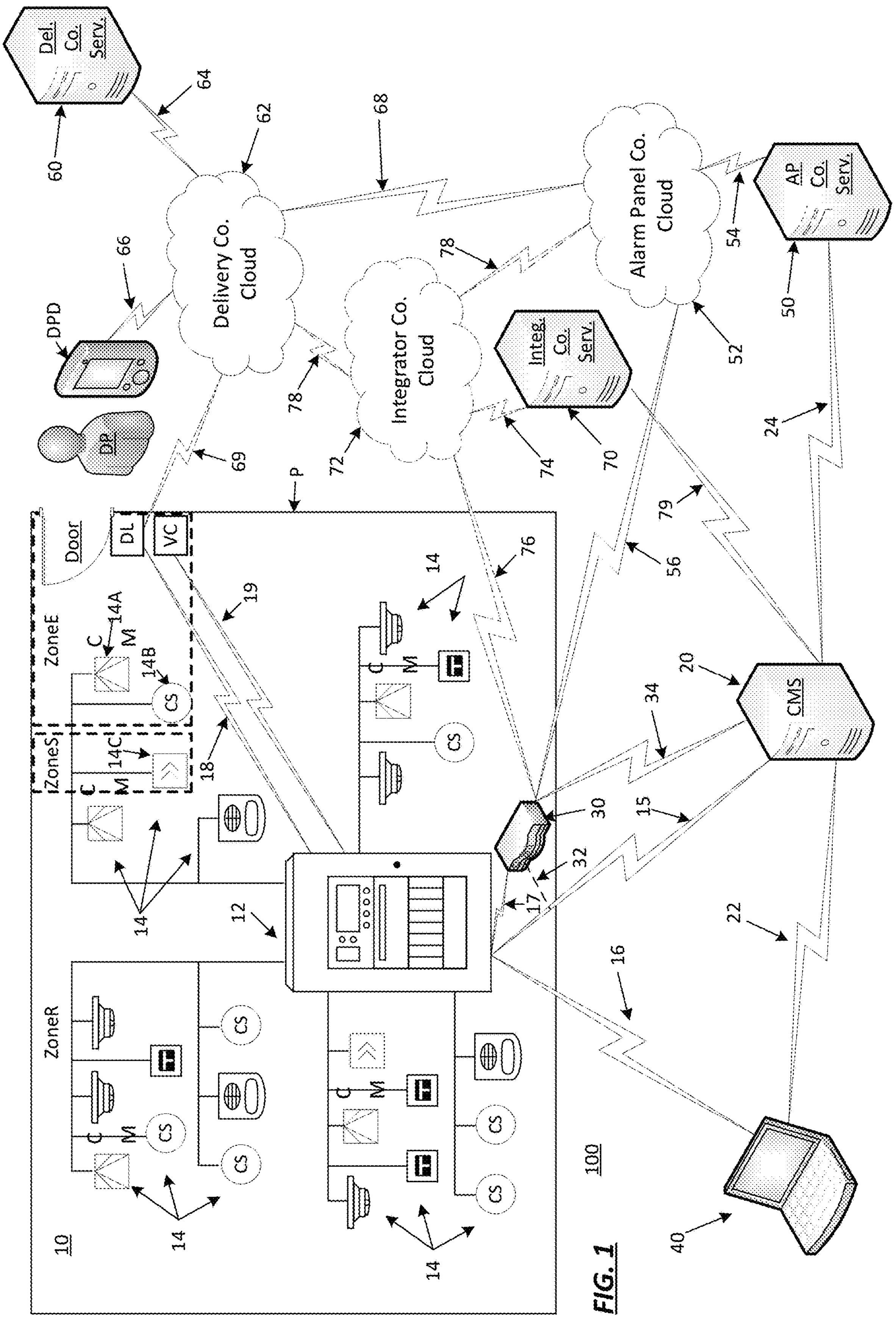
FIG. 1 is a block diagram illustrating an example alarm system including arrangements to provide the ability to allow authorized personnel temporary access into monitored premises without triggering an alarm event.

As discussed above, there is a greatly increasing need or desire to allow authorized personnel temporary (transient) access into monitored premises without triggering an alarm event. To this end, arrangements allowing authorized personnel temporary access into monitored premises without triggering an alarm event in accordance with the present disclosure, will now be described more fully hereinafter with reference to the accompanying drawings. In some examples, an alarm panel as an alarm system controller is configured with abilities to accept information and requests related to the temporary access, and to facilitate the temporary access. With some examples, another entity (e.g., alarm company server; integrator server) may substitute as an intermediary for brokering requests and notifications between an alarm panel and an access-gaining entity (e.g., delivery company).

Furthermore, these disclosed arrangements may be embodied in many different forms and are not to be construed as limited to the embodiments set forth herein. Rather, these embodiments are provided so that this disclosure will be thorough and complete, and will fully convey the scope of the invention to those skilled in the art. In the drawings, like numbers refer to like elements throughout.

It will be appreciated by those of ordinary skill in the art that the temporary access arrangements described herein may be implemented for virtually any type of alarm, monitoring, or control system, including, but not limited to, fire alarm systems, burglar alarm systems, surveillance systems, air quality monitoring systems, inventory monitoring systems, etc., or any combination thereof, such as may be provided for detecting an alarm event (e.g., a security breach) or a warning condition (e.g., an elevated temperature) in a building, structure, enclosure, or area (collectively referred to herein as "premises" or "sites"). Many other applications are contemplated and may be implemented without departing from the scope of the present disclosure. All such applications are collectively referred to herein as "alarm systems" for convenience.

An exemplary alarm system in accordance with the present disclosure is depicted in FIG. 1. The disclosed system 100 may include an alarm system 10 installed at a monitored site or premises P. The alarm system 10 may include an alarm panel 12 (as an alarm system controller) operably connected to a number of points 14 (e.g., initiating devices and/or notification appliances). Furthermore, the alarm system 10 may be communicatively coupled to a central monitoring station (CMS) 20 via connection 15. In general, the central monitoring station 20 may be a server at a location remote from the monitored site. It is to be appreciated that the central monitoring station 20 may be a single computing device or may be multiple computing devices. The computing devices may be provided at a single location, or distributed at differing locations. For convenience of discussions within this disclosure, however, the central monitoring station 20 is referred to as a single device at a single location.

During operation of the alarm system 10, various maintenance needs (such as repair and updating) may arise. Additionally, the central monitoring station 20 may be configured to validate the installation (or configuration) of the alarm system 10 to reduce the probability of future maintenance needs of the system. As may be appreciated, during installation of the alarm system 10, a technician may place the points 14 throughout the site to be monitored by the alarm system 10. Furthermore, the technician may configure the alarm panel 12 to recognize the points 14. This may include organizing the points 14 into different zones, configuring the behavior of the alarm panel 12 in response to signals received from the points 14, and configuring a connection 15 between the alarm panel 12 and the central monitoring station 20.

In order to aid in the installation or aid in later maintenance, the technician may utilize a computing device 40. The computing device 40 may be a portable computing device (e.g., a laptop computer, a tablet computer, a smart phone, or the like) that may be communicatively coupled to the alarm panel 12 via connection 16 and coupled to the central monitoring station 20 via connection 22.

In general, the connections (or paths) 15, 16 and 22 may be any type of data communication connection configured to allow signals to be transmitted between ones of the alarm panel 12, the central monitoring station 20, and the computing device 40. It is noted that although the connections 15, 16 and 22 are depicted in FIG. 1 as wireless connections, the connections may be wireless or may be wired. Furthermore, with some examples, the connections 15, 16, and/or 22 may be routed through a network (e.g., a TCP/IP network, a cellular network, a packet switched network, the Internet, or the like). Additionally, the connections 15, 16 and 22 may not be a same (common) type of connection. For example, the connection 15 may be a cellular telephone connection, the connection 16 may be a universal serial bus connection, and the connection 22 may be a connection routed through the Internet. Still further, the connections 15, 16 and 22 may each vary in type along a connection path thereof. For example, a connection may be partly routed through the Internet, partly routed through a cellular network, etc.

The disclosed system 100 may further include a communicator 30 installed as part of the alarm system 10 at the monitored site. The communicator 30 may contain cellular or some other type of communication capability, and may be provided integrated as part of the alarm panel electronics, or may be provided as a separate apparatus installed: within the alarm panel 12; adjacent to the alarm panel 12; or somewhere within the monitored site. For example, the communicator 30 may be installed within the alarm panel 12 or adjacent to the alarm panel 12, if acceptable cellular reception is available at such installation locations. As another example, the communicator 30 may be installed elsewhere in the monitored site (i.e., remote from the alarm panel 12) to achieve better cellular reception, better accessibility, etc.

Such communicator 30 may be a universal (i.e., generic) communicator which is capable of working properly with many differing types of alarm systems and/or alarm panels 12. Alternatively, the communicator 12 may be proprietary in construction, and designed to work with a particular brand/model of alarm system and/or alarm panel 12.

One purpose of the communicator 30 may be to monitor (see FIG. 1 dashed line 32) for failures in communications between the alarm panel 12 and the central monitoring station 20 along the connection 15. As long as the connection between the alarm panel 12 and the central monitoring station 20 remains viable (i.e., working properly), the communicator device 30 would do nothing with any data available from the connection 15. In the event of a detected failure of the connection 15, the communicator 30 would then utilize (e.g., activate, establish) the communicative coupling connection 34 to provide an alternative (e.g., emergency; fail-over) communications path or channel between the alarm panel 12 and the central monitoring station 20. The communicator 30 then would access and route the data through the connection 34, to the central monitoring station.

As one non-exhaustive, non-limiting connection failure example, the connection 15 may be provided via a Plain Old Telephone Service (POTS) hardwire line or may be provided via the Internet, and failure thereof may result because of a physical line cut (e.g., by an intruder) or loss of Internet connection (e.g., by storm-induced outages). In contrast, the connection 34 may be a cellular connection. That is, the connections 15 and 34 can be of differing types from one another such that a type of failure affecting connection 15 will hopefully not also affect connection 34. Such allows the alarm panel 12 a redundant ability to communicate with the central monitoring station 20, even upon failure of the primary connection 15.

While the above example represents a combined mode where the communicator 30 partially operates in a passive mode and partially operates in an active mode, in some alarm system installations, the connection 15 may be non-existent, and may be purposefully replaced by connection 34 and with the communicator 30 only operating in the active mode. As one situation where this might happen, consumers have trended toward eliminating residential POTS hardwire lines to save costs. In such situations where there is an absence of the connection 15, the connection 34 might be used as a primary connection between the alarm panel 12 and the central monitoring station 20.

Sometimes connection 15 failures may even result in data being unavailable along such failed connection 15. In such situations or in situations where the connection 15 is non-existent, the communicator 30 would not be able to obtain alarm panel data via the connection 15. Accordingly, a connection 17 (e.g., a wired USB connection) may be used to provide alternative (direct) communications between the alarm panel 12 and the communicator 30. Such connection 17 would serve to get data from the alarm panel 12 to the communicator 30 in view of no information being delivered from the alarm panel 12 to the communicator 30 via the connection 15.

Another purpose of the communicator 30 may be to facilitate communications between outside entities (e.g., an alarm company server; an alarm equipment manufacturer server; an integrator company) and the alarm panel 12. Accordingly, the communicator 30 together with the connection 17 may also be utilized to allow such communications between the outside entities and the alarm panel 12. For security, some type of authentication capabilities may be configured into the alarm panel 12 and/or communicator 30 to require authentication between any outside entity (e.g., CMS, alarm company server; alarm equipment manufacturer server; integrator company) and the alarm panel 12 and/or communicator 30, before further communications are allowed between the outside entities and the alarm panel 12 and/or communicator 30.

For convenience of discussions and for a sake of brevity, authentication capabilities and success of authentication between all electronic entities discussed as communicating within this disclosure, will be presumed and will not be substantially discussed further.

To assist in a better understanding of the invention, a disadvantaged temporary access example concerning delivery of an item to a home premises will now be described using FIGS. 1, 10A and 10B. More particularly, the alarm system 10 of the home premises P may have a number of points 14, including points 14A, 14B monitoring an entry ZoneE, and a point 14C monitoring a secondary ZoneS. Other remaining points 14 are provided within a remainder ZoneR.

Further shown in FIG. 1 are a delivery company server 60 connected (via a connection 64) to a delivery company cloud 62, which in turn is connected (via a connection 66) to a delivery person device DPI) carried by a delivery person DP. The delivery company cloud is further connectable (via a connection 69) to a door lock DL securing a door of the premises P. The door lock DL may have wireless e.g., cellular or Internet) connection capabilities, and may be remotely controllable, for example, by a remote entity issuing some type of lock and/or unlock commands over an established connection. Non-exhaustive example wireless protocols may include Bluetooth, UPS, GSM/CDMA, WiFi/WiMax and ZigBee. In one example, the door lock DL may be sourced from, and proprietary to, a delivery company. In another example, the door lock DL may be a commercially available lockset. In either example, the delivery company server 60 may be privy to access information for authenticating, connecting to and controlling such door lock DL. A premises' resident may have provided such access information to the delivery company (e.g., in advance of an expected delivery).

Next, in general, the delivery company server 60 may be a server at a location remote from the monitored site or premises P. It is to be appreciated that the delivery company server 60 may be a single computing device or may be multiple computing devices. The computing devices may be provided at a single location, or distributed at differing locations. For convenience of discussions within this disclosure, however, the delivery company server 60 is referred to as a single device at a single location.

Further, although FIG. 1 illustrates delivery company resources (e.g., delivery company server 60, delivery company cloud 62, etc) of only a single delivery company for sake of brevity and simplicity, it is to be understood that a real-world environment would involve multiple (e.g., independent) delivery companies. A non-limiting, non-exhaustive listing of delivery companies might include: ABC Package Delivery Company (ABC-PDCo); DEF Package Delivery. Company (DEF-PDCo); XYZ Package Delivery Company (XYZ-PDCo); etc. It will be assumed throughout this disclosure that the FIG. 1 delivery company resources (e.g., delivery company server 60, delivery company cloud 62, etc.) illustrated belong to ABC-PDCo.

In general, the connections 64, 66 and 69 may be any type of data communication connection configured to allow signals to be transmitted between ones of the delivery company server 60, the delivery cloud 62, the delivery person device DPD and the door lock DL. It is noted that although the connections 64, 66 and 69 are depicted as FIG. 1 wireless connections, the connections may be wireless or may be wired. As examples, the connections 64, 66 and 69 may be routed through a network (e.g., a TCP/IP network, a cellular network, a packet switched network, the Internet, or the like). Additionally, the connections 64, 66 and 69 may not be a same (common) type of connection. For example, the connection 64 may be routed through the Internet, while the connections 66 and 69 may be cellular telephone connections. Still further, the connections 64, 66 and 69 may each vary in type along a connection path thereof. For example, a connection may be partly routed through the Internet, and partly routed through a cellular network.

The delivery person device DPD may be, for example, a cell phone, smart phone, personal digital assistant (PDA), tablet, notebook, proprietary computing unit, etc. If the delivery person device DPD is an easily-carried mobile device such as a cell phone, smart phone, PDA, tablet, notebook, etc., then the delivery person device DPD may be advantageously carried by the delivery person DP wherever he/she might go, e.g., carried by the delivery person DP as he/she exits a delivery vehicle and approaches a premises door to make delivery.

Figure 10A:
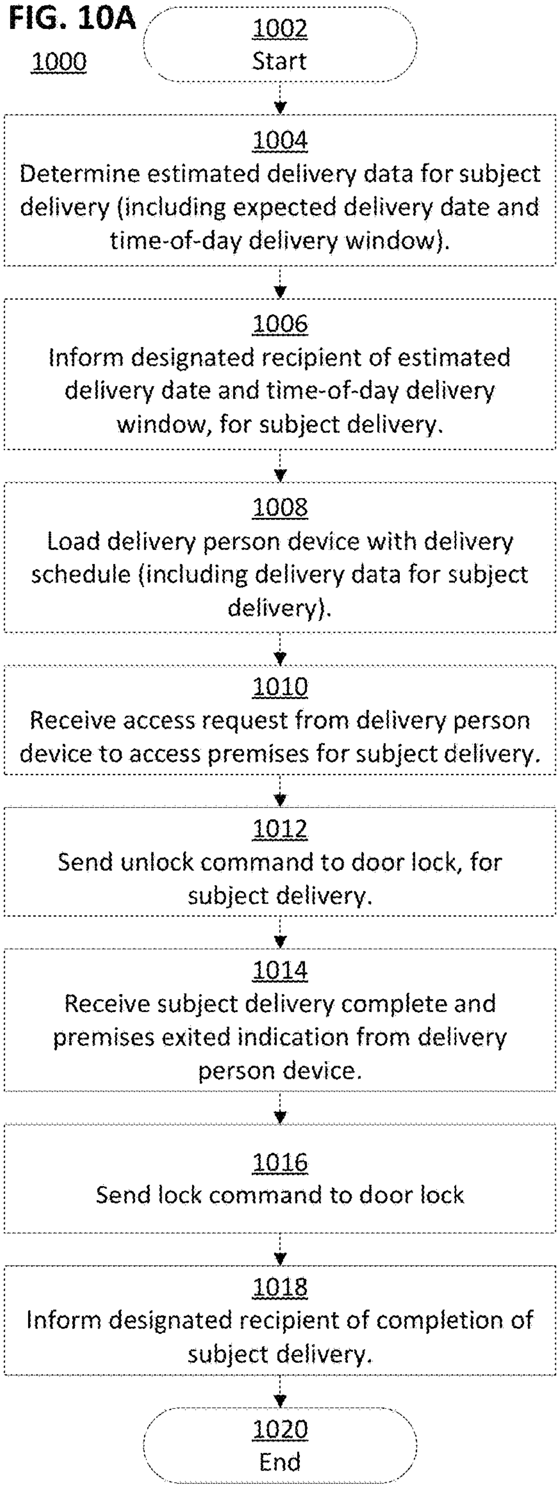
FIGS. 10A, 10B and 11-14 are flow diagrams illustrating example methods for explaining or for achieving the ability to allow authorized personnel temporary access into monitored premises without triggering an alarm event.
Figure 10B:
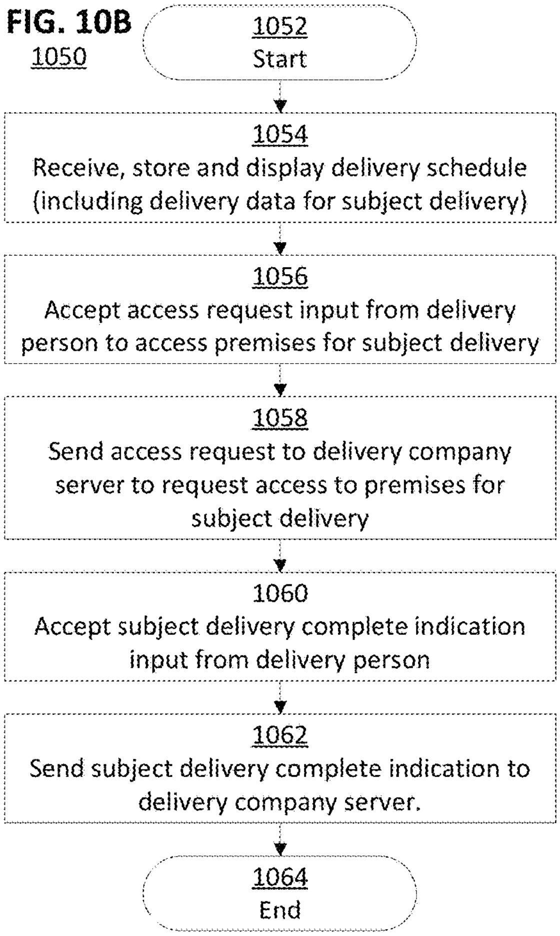

FIGS. 10A and 10B show example flow operations 1000 and 1050 performed by the delivery company server 60 and delivery person device DPD, respectively, for the delivery person DP to gain temporary access to the premises P to place a delivery item therein. More particularly, after FIG. 10A's start 1002, the delivery company server 60 determines (operation 1004) estimated delivery data for a subject delivery, with the data including, for example: an expected delivery date and time-of-day delivery window. Such data items are non-limiting and non-exhaustive of differing data items which may be determined, and are simply given as examples.

At operation 1006, an optional operation of informing a designated recipient (e.g., a homeowner who ordered the delivery item) of the estimated delivery date and time-of-day delivery window for the subject delivery, may be performed. Next, at operation 1008, the delivery person device DPD may be loaded with a (e.g., daily; work shift; etc.) delivery schedule which may include delivery data (e.g., delivery map/directions; delivery address; recipient's name; number of delivery items; etc.) for the subject delivery. That is, loading from the delivery company server 60 into the delivery person device DPD may be accomplished via the delivery company cloud 62 and connections 64, 66.

Next, after FIG. 10B's start 1052 operation, the delivery person device DPD may receive, store and display the (e.g., daily; work shift; etc.) delivery schedule (operation 1054). Included within the displayed delivery schedule is the information regarding the subject delivery. At some point during the day, the delivery person DP arrives at a door of the delivery premises P. Through use of an input device (e.g., hard button, soft button, touch screen, keyboard, etc.), the delivery person inputs, and the delivery person device DPD accepts, an access request to request access to the premises for the subject delivery (operation 1056). At operation 1058, the delivery person device DPD sends the access request to the delivery company server 60. Sending from the delivery person device DPD to the delivery company server 60 again may be accomplished via the delivery company cloud 62 and connections 64, 66.

Next, at FIG. 10A's operation 1010, the delivery company server 60 receives and stores (e.g., caches) the access request from the delivery person device DPD, requesting access to the delivery premises for the subject delivery. The delivery company server 60 may then connect and send an unlock command to the door lock DL (operation 1012). A delivery person DP may become aware of the unlock via any number of ways, e.g., by hearing the door lock unlock, by an indicator display or (e.g., green) light on the lock, by a "Door unlocked." message sent from the delivery company server 60 and displayed on the delivery person device DPD, etc. The delivery person DP then opens the unlocked door to gain access to an inside of the premises P, theoretically just long enough and far enough into the premises to deposit the delivery item inside the premises. The delivery person DP then theoretically exits the premises and manually closes and locks the door behind him/her.

After delivery and exiting, and again using the input device (e.g., hard button, soft button, touch screen, keyboard, etc.), the delivery person inputs, and the delivery person device DPD accepts, a "subject delivery complete" indication (operation 1060). At operation 1062, the delivery person device DPD sends the indication to the delivery company server 60. Sending from the delivery person device DPD to the delivery company server 60 again may be accomplished via the delivery company cloud 62 and connections 64, 66. At operation 1064, operations of the delivery person device DPD (with respect to this subject delivery) end.

At FIG. 10A's operation 1014, the delivery company server 60 receives and stores (e.g., caches) the "subject delivery complete" indication from the delivery person device DPD. Responsive thereto, the delivery company server 60 sends a lock command to the door lock DL (operation 1016). At operation 1018, an optional operation of informing a designated recipient (e.g., a homeowner who ordered the delivery item) of the completed subject delivery, may be performed. At operation 1020, operations of the delivery person device DPD (with respect to this subject delivery) end.

The above-described example access operations may be less-than-desirable in a number of regards. First, as premises access is being gained by an entity (e.g., delivery company and/or delivery person DP) which is not the premises' resident or any alarm company (e.g., CMS) agent, there is no coordination with deactivating/reactivating the alarm system in conjunction with the temporary access. Accordingly, it is highly likely that the delivery person DP's entry will result in an alarm event if the alarm system is left activated. That is, at least alarm points 14*a* (e.g., a motion detector) and 14B (e.g., a (door) contact switch (CS)) monitoring in the entry ZoneE near the door will detect and signal the delivery person DP's entry to the alarm panel 12, which in turn would generate the alarm event (e.g., alarm notification). As non-exhaustive examples, contact switches (CS) may be mounted on a door or window, and may be triggered by an opening, closing or movement of the door or window. Alarm point 14*c* may be, for example, a video motion detector.

As one solution, the premises' resident could deactivate (turn-off) the alarm system 10 for the entire day or for the entire time-of-day delivery window period for when the delivery was expected. As a differing option, the delivery company might contact the premises' resident (e.g., via text message) at a time immediately preceding (e.g., minutes before) an imminent access, so as to have the premises' resident turn the alarm system off for the access. Another resident contact would be needed at a time immediately after the access, to turn the alarm system back on. However, such multiple calls require difficult cooperation and coordination among a number of entities, and thus is highly likely to experience failure. Further, contacting represents a significant burden on the premises' resident to remain available for a significant time window within which the subject delivery might occur.

In any event, deactivating the alarm for an entire day or for many hours is not an attractive option in that it leaves the premises vulnerable. That is, if an entirety of the alarm system is deactivated, the delivery person DP may freely wander throughout the premise, to steal, violate privacy, etc., or perform other undesirable activities (e.g., check medicine cabinets for prescription drugs; scope out valuables throughout the premises for later criminal activities, etc.). Additionally, irrespective of any delivery access, deactivating leaves the premises vulnerable to criminals in general.

Next, there may be no guarantee that the delivery person DP and/or the delivery company will actually lock the door after the delivery has been completed. As one example, it is highly likely that the delivery person DP might be under a tight delivery schedule, and that rushing onward to a next delivery might easily make him/her forget to lock the door and/or notify the delivery company 60 that the delivery is complete. If the delivery person DP forgets to notify the delivery company 60, the door may remain unlocked until the homeowner returns home.

Discussion turns next to a more desirable (example) approach, i.e., one wherein an alarm controller such as an alarm panel (not some outside entity) is configured to provide temporary access operations, control alarm system behavior and provide a guarantee that the door gets locked. To enable such approach, further shown within FIG. 1 are an alarm panel company server 50 connected (via a connection 54) to an alarm panel company cloud 52, which in turn is connected (via a connection 56) to the communicator 30 connected (via the connection 17) to the alarm panel 12. Thus, the combination of the communicator 30 together with the connections 17, 54, 56 and cloud 52, may be utilized to also allow communications between the alarm panel company server 50 and the alarm panel 12.

In general, the alarm panel company server 50 may be a server at a location remote from the premises P or monitored site. It is to be appreciated that the alarm panel company server 50 may be a single computing device or may be multiple computing devices. The computing devices may be provided at a single location, or distributed at differing locations. For convenience of discussions within this disclosure, however, the alarm panel company server 50 is referred to as a single device at a single location.

The alarm panel company server 50 may belong to, and be maintained by, the alarm panel 12's manufacturer or supplier. The alarm panel manufacturer or supplier may be a logical choice for configuring temporary access abilities to the alarm panel, in that the manufacturer or supplier may be the entity which is most privy to understanding the construction and inner workings (e.g., firmware, software, command set, modes, limitations, etc.) of the alarm panel and system. Plus, the alarm panel manufacturer or supplier may strongly discourage other entities from modifying the alarm panel and system, out of an abundance of caution that outside modification might negatively affect the operations and/or security provided by the alarm panel and/or alarm system.

Further shown in FIG. 1 is the alarm panel company cloud 52 also being connected (via the connection 68) to the delivery company cloud 62. Thus, the alarm panel company server 50 and the delivery company server 60 may communicate with each over via the combination of the connections 54, 64, 68 and clouds 52, 62, to allow, for example, communication and cooperation between the alarm panel company server 50 and the delivery company server 60, to accomplish a temporary access to the house premises P.

The alarm panel company server 50 may be further connected to the CMS 20 via connection 24. Such connection 24 may allow the direct exchange of data therebetween. For example, a zone or points list or other system configuration data may be forwarded from the central monitoring station 20 to the alarm panel company server 50. The alarm panel company server 50 may need such information when configuring the alarm panel with temporary access operations/abilities, and/or when setting up a new account for a new temporary access subscriber.

As another example, the central monitoring station 20 may be configured to send a copy of alarm notifications to the alarm panel company server 50 in real-time, in addition to any reporting of the alarm notifications to the premises' resident. That is, the alarm panel company server 50 may need to be aware of any alarm events which might be associated with any temporary access which it might oversee. As one example, upon an alarm event occurring in connection with (i.e., at as same time as) a given temporary access, the alarm panel company server 50 may immediately contact the delivery company involved with the given temporary access, and request explanation of the cause of the alarm event from the delivery company (e.g., did the delivery person DP stray into the house too far, attempting to use a bathroom?). The alarm panel company server 50 may then convey that explanation back to the CMS 20 and/or the premises' resident subscriber (e.g., with an apology).

In short, the alarm panel manufacturer or supplier may have a strong interest in overseeing that temporary accesses are conducted without any alarm events. That is, alarm notifications resultant from problems with temporary accesses may irritate the premises' resident subscriber, and the alarm events may even cost the subscriber a fine issued by a local safety authority (e.g., the police) for a false alarm and/or too many alarms. If any particular delivery company incurs an unacceptable number of alarm events (e.g., by repeated delivery company and/or delivery person errors), the alarm panel company may choose to sever a business relationship with that delivery company and prohibit them from further temporary accesses.

The FIG. 1 alarm panel is further connectable (via a connection 18) to the door lock DL securing the door of the premise, and is connectable (via a connection 19) to a video camera VC positioned to record a real-time image of an inside of the premises within at least the entry ZoneE, when instructed to do so. With the present example, the alarm panel 12 would control the residence's door lock DL, and the delivery company server 60 would not have any ability to communicate with or lock/unlock the door lock DL. By having the alarm panel 12 control the door lock DL, the locking/unlocking of the door lock DL can be advantageously timed properly in conjunction with deactivating/reactivating, portions (i.e., zones) of the alarm system as discussed later.

In general, the connections 18, 19, 24, 54, 56 and 68 may be any type of data communication connection configured to allow signals to be transmitted between ones of the alarm panel 12, the CMS 24, the communicator 30, the alarm panel company server 50, the alarm panel company cloud 52, the delivery company cloud 62, the door lock DL and the video camera VC. It is noted that although the connections 18, 19, 24, 54, 56 and 68 are depicted as FIG. 1 wireless connections, the connections may be wireless or may be wired. As examples, the connections 18, 19, 24, 54, 56 and 68 may be routed through a network (e.g., a TCP/IP network, a cellular network, a packet switched network, the Internet, or the like). Additionally, the connections 18, 19, 24, 54, 56 and 68 may not be a same (common) type of connection. For example, the connection 54 may be routed through the Internet, while the connections 56 and 18 may be cellular telephone connections. Still further, the connections 18, 19, 24, 54, 56 and 68 may each vary in type along a connection path thereof. For example, a connection may be partly routed through the Internet, and partly routed through a cellular network.

FIGS. 11-14 show example flow operations 1100-1400 performed by the delivery company server 60, alarm panel company server 50 and alarm panel 12, as an improved approach for the delivery person DP to gain temporary access to the premises P to place a delivery item therein. In addition, previously-discussed FIG. 10B pertaining to operations performed by the delivery person device DPD, is also applicable to explanation of this approach.

Figure 11:
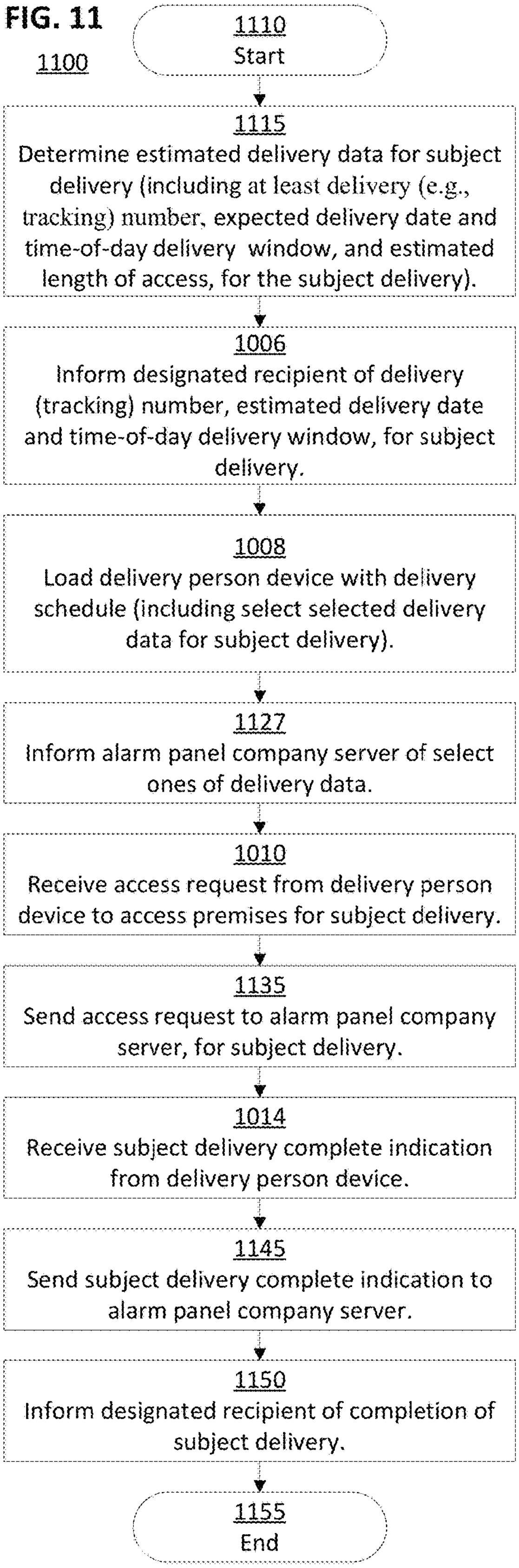

In beginning discussions, after FIG. 11's start 1110, the delivery company server 60 determines estimated delivery data (operation 1115) for a subject delivery, with the data including at least: a delivery (e.g., invoice or tracking) number associated with the delivery; expected delivery date; time-of-day delivery window; and estimated length of access for the subject delivery. The delivery (e.g., invoice or tracking) number assigned to the subject delivery, may serve as an identifier useable across time and across entities (e.g., delivery company server 60; alarm panel company server 50; alarm panel 12) to identify instances of data and communications which are connected with (i.e., pertain to) a same subject delivery. The above data items are non-limiting and non-exhaustive of differing data items which may be determined, and are simply given as examples.

FIG. 7 illustrates an example database 700 which may be maintained by a delivery company server 60 in connection with deliveries it is overseeing. Such database may (for example) contain the data items stored within the following example columns: 701 (Delivery #) storing a delivery (e.g., invoice or tracking) number associated with each delivery; 702 (ShipCo) storing a company name from which the delivery item originated; 703 (DeliveryAddr) storing an address where each delivery should be delivered; 704 (DeliveryCity) storing a city associated with the address; 705 (DeliveryState) storing a state associated with the address; 706 (RecipientName) storing a recipients name for each delivery; 707 (RecipientEmail) storing a recipient's email address; 708 (RecipientCell) storing a recipient's cell phone number; 709 (DelivStatus) storing a (e.g., Pending, Complete, etc.) status of each delivery; 710 (EstDelivDate) storing an estimated delivery date (e.g., 20180220) determined for each delivery; 711 (EstDelivWindow) storing an estimated time-of-day delivery window (e.g., 0900-1200 am) for each delivery; 712 (ActDelivDate) storing an actual date (e.g., 20180126) when delivery was completed; 713 (#DelivItems) storing a number of items (e.g., 1; 39) to be delivered at each delivery; 714 (EstLengthAcc) storing an estimated (e.g., number of minutes) length of access (e.g., 0005) into a premises for each delivery; etc. Item 715 may represent additional data columns. Such data items are non-limiting and non-exhaustive of differing data items which may be databased, and are simply given as examples. Row 751 contains column headings, while rows 752-756 each pertain to a different delivery, respectively. It should be understood that such database may actually contain significantly more rows than the few example rows illustrated, i.e., only a limited number of rows are illustrated and described for sake of brevity and simplicity of this disclosure.

In turning back to FIG. 11, operation 1006, the designated recipient (RecipientName)(e.g., a homeowner who ordered the delivery item) may optionally be sent the: delivery number (Delivery #); company from which the delivery item originated (ShipCo); estimated delivery date (EstDelivDate); and time-of-day delivery window (EstDelivWindow), for the subject delivery. Such data items are non-limiting and non-exhaustive of differing data items which may be sent, and are simply given as examples. Sending of such information to the designated recipient may be accomplished, for example, via email (to RecipientEmail) and/or text messaging (to RecipientCell).

Next, at operation 1008, the delivery person device (DPD) may be loaded with a e.g., daily; work-shift; etc.) delivery schedule which may include select ones of the delivery data from the database 700 for each delivery (including the subject delivery) that a delivery person DP is tasked to make. For example, the delivery person device DPD may be loaded with the: delivery (e.g., invoice or tracking) number (Delivery #); recipient's name (RecipientName); delivery address (DeliveryAddr); delivery city (DeliveryCity); delivery state (DeliveryState); estimated time-of-day delivery window (EstDelivWindow); number of delivery items (#DelivItems); estimated time length of access (EstLengthAcc); etc., for the subject delivery. Such data items are non-limiting and non-exhaustive of differing data items which may be loaded, and are simply given as examples. Loading from the delivery company server 60 into the delivery person device DPI) may be accomplished via the combination of the delivery company cloud 62 and connections 64, 66.

Next, at operation 1127, the delivery company server 60 informs the alarm panel company server 50 of select ones of the delivery data (e.g., delivery (e.g., invoice or tracking) number (Delivery #); shipping company (ShipCo); recipient's name (RecipientName); delivery address (DeliveryAddr); delivery city (DeliveryCity); delivery state (DeliveryState); estimated time-of-day delivery window (EstDelivWindow); number of delivery items (#DelivItems); estimated time length of access (EstLengthAcc); etc.) for the subject delivery. Such data items are non-limiting and non-exhaustive of differing data items which may be sent, and are simply given as examples. The Sending from the delivery company server 60 to the alarm panel company server 50 may be accomplished via the combination of the alarm panel company cloud 52, delivery company cloud 62, and connections 54, 68 and 64.

The delivery (e.g., invoice or tracking) number (Delivery #) assigned to the subject delivery, may allow the alarm panel company server 50 to identify and relate other data and communications over time, which correspond to the subject delivery. Further, the delivery address (DeliveryAddr), delivery city (DeliveryCity) and delivery state (DeliveryState) may help the alarm panel company server 50 determine which alarm panel that the subject delivery corresponds to, i.e., out of the thousands of alarm panels which the server 50 might oversee temporary access services for.

That is, FIG. 8 illustrates an example database 800 which may be maintained by the alarm panel company server 50 for overseeing the alarm panels of its subscribers. Such database may (for example) contain data items detailed by the following example columns: 801 (PanelSN) storing a serial number (e.g., 81764; 72229; etc.) associated with the subscriber's alarm panel; 802 (PanelIPAddr) storing an Internet Protocol (IP) address (e.g., 127.242.0.19; 127.341.0.20; etc.) associated with the subscriber's alarm panel; 803 (PanelAddr) storing a street address where the subscriber's alarm panel is located; 804 (PanelCity) storing a city associated with the street address; 805 (PanelState) storing a state associated with the street address; 806 (PanelCustomer) storing a customer's name associated with the subscriber's alarm panel; 807 (PanelCustEmail) storing the customer's email address; 808 (PanelCustomerCell) storing the customer's cell phone number; 809 (ZoneAccess?) storing an indication of whether a temporary zoned access is "Allowed" or "Not Allowed" with respect to the customer's alarm panel. Item 810 may represent additional data columns. Such data items are non-limiting and non-exhaustive of differing data items which may be databased, and are simply given as examples. Row 851 contains column headings, while rows 852-857 pertain to each alarm panel subscriber, respectively.

It should be understood that such database may actually contain significantly more rows, and each row would pertain to a differing alarm panel. Only a limited number of rows are illustrated and described for sake of brevity and simplicity of this disclosure.

Further, while FIG. 1 illustrates only an alarm system 10 and alarm panel 12 installed in a single premises P (e.g., house) for sake of brevity and simplicity, it is to be understood that a real-world environment would involve many other alarm systems and alarm panels installed in many premises. Further, a given premises may have multiple alarm panels. A non-exhaustive, non-limiting listing of differing types of premises may include: houses; apartments; buildings; businesses; restaurants; stores; churches; etc.

Figure 12:
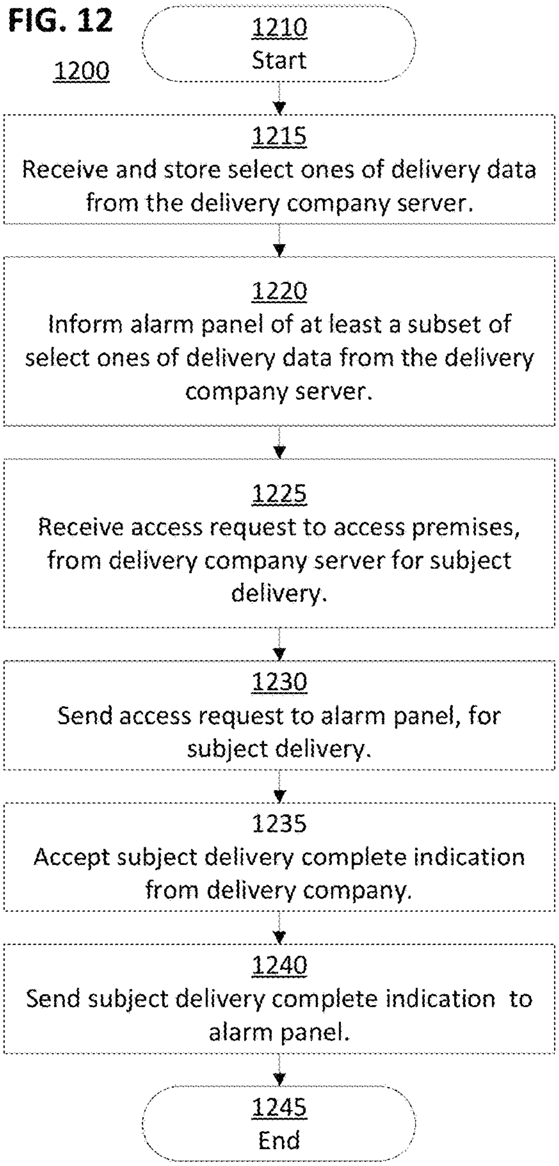

The alarm panel company server 50, after FIG. 12's start operation 1210, receives (operation 1215) and stores (e.g., caches) the select ones of the delivery data (e.g., delivery (e.g., invoice or tracking) number (Delivery #); shipping company (ShipCo); recipient's name (RecipientName); delivery address (DeliveryAddr); delivery city (DeliveryCity); delivery state (DeliveryState); estimated time-of-day delivery window (EstDelivWindow); number of delivery items (#DelivItems); estimated time length of access (EsthengthAcc); etc.) for the subject delivery. In addition, it will be assumed that the alarm panel company server 50 can determine the identification of the package delivery company (e.g., ABC-PDCo) which sent the delivery data (e.g., from information within the communication), and that the alarm panel company server 50 stores (e.g., caches) a delivery company identifier (DelivCold) in association with the delivery data of the subject delivery.

By matching ones of the received recipient's name RecipientName), delivery address (DeliveryAddr), delivery city (DeliveryCity) and/or delivery state (DeliveryState) data received from the package delivery company server 60 (see, e.g., FIG. 7's row 753 data as an example), against ones of the 806 (PanelCustomer) customer's name, 803 (PanelAddr) street address, 804 (PanelCity) city and/or 805 (PanelState) state data stored in the database 800, the alarm panel company server 50 may determine that the received data for the subject delivery, pertains to particular subscriber panel. In this example, it is assumed that it is determined that the subject delivery pertains to the subscriber panel associated with Row 853.

It is noted that matching may not be achieved across all items which are compared. For example, while the compared address, city and state data of the above-mentioned rows 753 and 853 may be found to match, a received recipient's name (RecipientName) originating from the delivery company server's database 700 (see row 753, column 706), and a (PanelCustomer) customer's name stored in the alarm panel company server's database 800 (see row 853, column 806), do not match. Accordingly, the alarm panel company server 50 may make its determination based upon a partial match (e.g., three out of four data item matches). In the present example, it will be assumed that the alarm panel company server 50 has determined that the received data corresponds to the FIG. 8 row 853 having the PanelSN of 81764, and having the PanelIPAddr of 127.242.0.19.

Next, the alarm panel company server 50 may then check further data stored within row 853 at column 809 (ZoneAccess?) to confirm that a temporary zoned access is "Allowed" with respect to the subscriber's alarm panel having the PanelSN of 81764. Whether or not temporary zoned access is "Allowed" may be based upon many criteria, such as: decision made by preference of the premises' resident; home-owners association (HOA) rules; existing equipment (e.g., points) capabilities/limitations; etc. That is, not all alarm panels or subscribers will permit temporary access to be allowed.

If a temporary zoned access is allowed (such as assumed in the present example), the alarm panel company server 50 then utilizes the obtained PanelIPAddr (e.g. 127.242.0.19) to inform the alarm panel 12 (FIG. 12 operation 1220) of at least a subset of the select ones of the stored (e.g., cached) delivery data. As one example, the alarm panel company server 50 may inform the alarm panel 12 of the: delivery company identifier (DelivCoId); delivery (e.g., invoice or tracking) number (Delivery #); shipping company (ShipCo); estimated delivery date (EstDelivDate); time-of-day delivery window (EstDelivWindow); number of delivery items (#DelivItems); and estimated time length of access (EstLengthAcc); etc.), for the subject delivery. Such data items are non-limiting and non-exhaustive of differing data items which may be sent, and are simply given as examples. Sending from the alarm panel company server 50 to the alarm panel 12 may be accomplished via combination of the alarm panel company cloud 52 and connections 54, 56 and 17.

Figure 13:
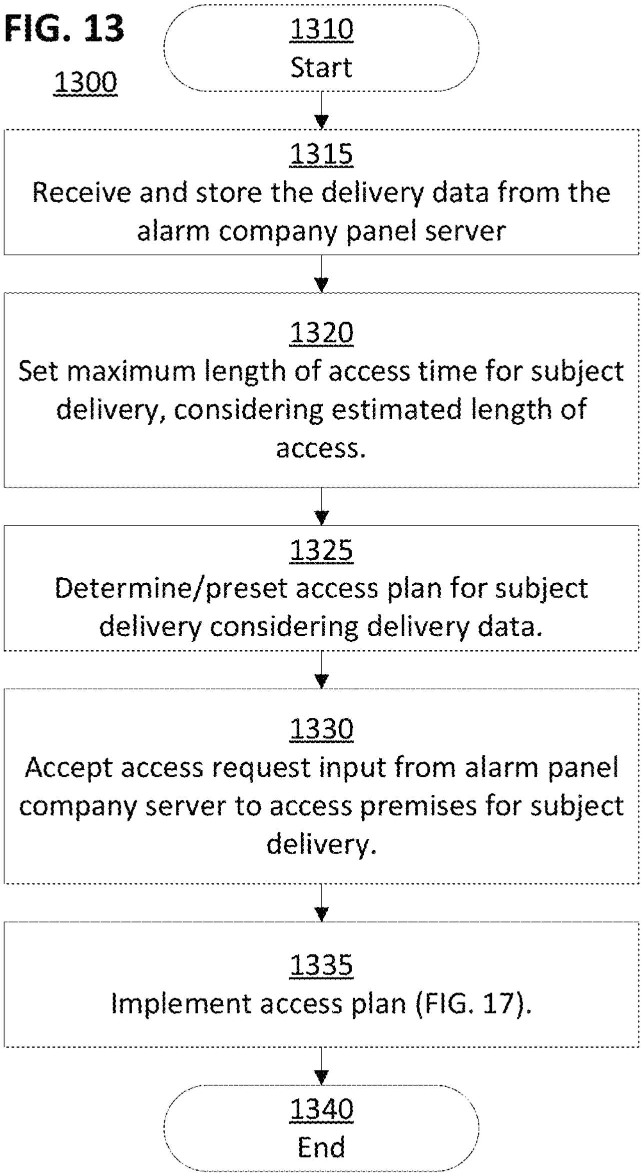

Next, after start operation 1310 in FIG. 13, the alarm panel 12 receives (operation 1315) and stores (e.g., caches) the delivery data from the alarm panel company server 50, including at least the: delivery company identifier (DelivCoId); shipping company (ShipCo); delivery (e.g., invoice or tracking) number (Delivery #); estimated delivery date (EstDelivDate); time-of-day delivery window (EstDelivWindow); number of delivery items (#DelivItems); and estimated time length of access (EstLengthAcc); etc.), for the subject delivery.

Next, at operation 1320, the alarm panel may consider some of the delivery data (e.g., the estimated length of access; number of delivery items) to determine whether to set its own maximum length of access time for the subject delivery. As one example, the determination of a maximum length of access time may be important to provide an extra buffer of access time to avoid a situation where an inadvertent alarm event is triggered by the access time running out before the access is complete. More particularly, there may be instances where a delivery person (DP) needs extra access time, for example, in a situation where the DP has difficulties fitting a bulky delivery item through the premises' door. Accordingly, as one example, if the delivery company server 30 had indicated (e.g., via the estimated delivery data) that the estimated length of access for the subject delivery was 5 minutes, the alarm panel may be configured to set 7 minutes as the maximum length of access time for the subject delivery, i.e., to provide that extra access time buffer in an attempt to better guarantee that an inadvertent alarm event is not incurred.

As another example, the determination of a maximum length of access time may also be important to avoid a situation where an incoming estimated time length of access (EstLengthAcc) data attempts (e.g., through mistake or through mischievous intent) to set an unacceptably long access time. As one example, if incoming data had indicated that the estimated length of access for the subject delivery was an unreasonably long 500 minutes, the alarm panel may be configured to set an overriding 15 minutes as the maximum length of access time for the subject delivery. A maximum allowable access time limitation which would be applicable across all deliveries and delivery companies, may be preprogrammed into, and stored within, the alarm panel for use when needed.

FIG. 9 illustrates an example database 900 which may be maintained by the alarm panel 12 for overseeing and effecting temporary accesses to the premises P. Such database may (for example) contain data items detailed by the following example columns: 901 (DelivCoID); 902 delivery tracking number (Delivery #); 903 shipping company (ShipCo); 904 delivery status (DelivStatus); 905 estimated delivery date (EstDelivDate); 906 estimated time-of-day delivery window (EstDelivWindow); 907 number of delivery items (#DelivItems); 908 estimated time length of access (EstLengthAcc); 909 maximum time length of access (MaxLengthAcc), for each delivery to the premises P. Item 910 may represent additional data columns. Such data items are non-limiting and non-exhaustive of differing data items which may be databased, and are simply given as examples. Row 951 contains column headings, while rows 952-954 pertain to each delivery, respectively.

In continuing discussion of alarm panel 12, at FIG. 13's operation 1325, the alarm panel 12 determines and/or presets an access plan for the subject delivery, using ones of the stored delivery data within the database 900. In one example, the alarm panel 12 would use various data (e.g., MaxLengthAcc; EstDelivDate; EstDelivWindow) for the subject delivery, to fill-in (i.e., complete) a predefined flow such as flow 1400 of FIG. 14. In the event that the alarm panel has data stored for several outstanding deliveries, then the alarm panel may set-up a corresponding number of access plans. Each access plan may be associated with a particular delivery via use of the delivery tracking number (Delivery #), so that the alarm panel 12 can utilize the delivery tracking number (Delivery #) of an incoming access request to know which prepared access plan to apply (e.g., implement).

Execution of the flow 1400 would, in one example, be triggered via receipt of the incoming access request originating from the delivery person device DPD. That is, the access plan may be set up in advance of the DP arriving at the premises' door, and the access request may be generated by the DP when he/she arrives at the door with delivery item in hand. Triggering execution of the temporary access flow 1400 via receipt of the incoming access request is advantageous, in that the alarm system remains fully armed right up until the temporary access. In discussion of the present example, it will be assumed that there is a separation in time (e.g., minutes; hours; days; etc.) between when the alarm panel sets up the access plan for the subject delivery and when the access request for the subject delivery is incoming. Implementation, however, is not limited to having a separation time, and the access plan set up and access request receipt may occur concurrently, simultaneously, in parallel, etc., in some implementations.

One example of the originating and sending of the access request, may be explained as follows. At some point during the day, the DP arrives at a door of the delivery premises P. Through use of an input device (e.g., hard button, soft button, touch screen, keyboard, etc.), the delivery person inputs, and the delivery person device DPD accepts, an access request to request access to the premises P for the subject delivery (FIG. 10B operation 1056). At operation 1058, the delivery person device DPI) sends the access request (e.g., together with the delivery tracking number (Delivery #)) to the delivery company server 60. Again, sending of the delivery tracking number (Delivery #) together with the access request, allows the various entities (e.g., delivery company server 62; alarm panel company server 50; alarm panel 12) to know to which scheduled delivery and delivery data the access request pertains.

At Operation 1010 of FIG. 11, the delivery company server 60 receives the access request (e.g., together with the delivery tracking number (Delivery #)) from the delivery person device DPD, and forwards the same (operation 1135) to the alarm panel company server 50. Likewise, at FIG. 12's operation 1225, the alarm panel company server 50 receives the access request (e.g., together with the delivery tracking number (Delivery #)) from the delivery company server 60, and forwards the same (operation 1230) to the alarm panel 12.

At FIG. 13's operation 1330, the alarm panel 12 receives the access request (e.g., together with the delivery tracking number (Delivery #)) from the alarm panel, and at operation 1335, the alarm panel 12 implements the access plan. After the access plan is implemented (described ahead), operations of the alarm panel 12 (with respect to this subject delivery) end (operation 1340).

Figure 14:
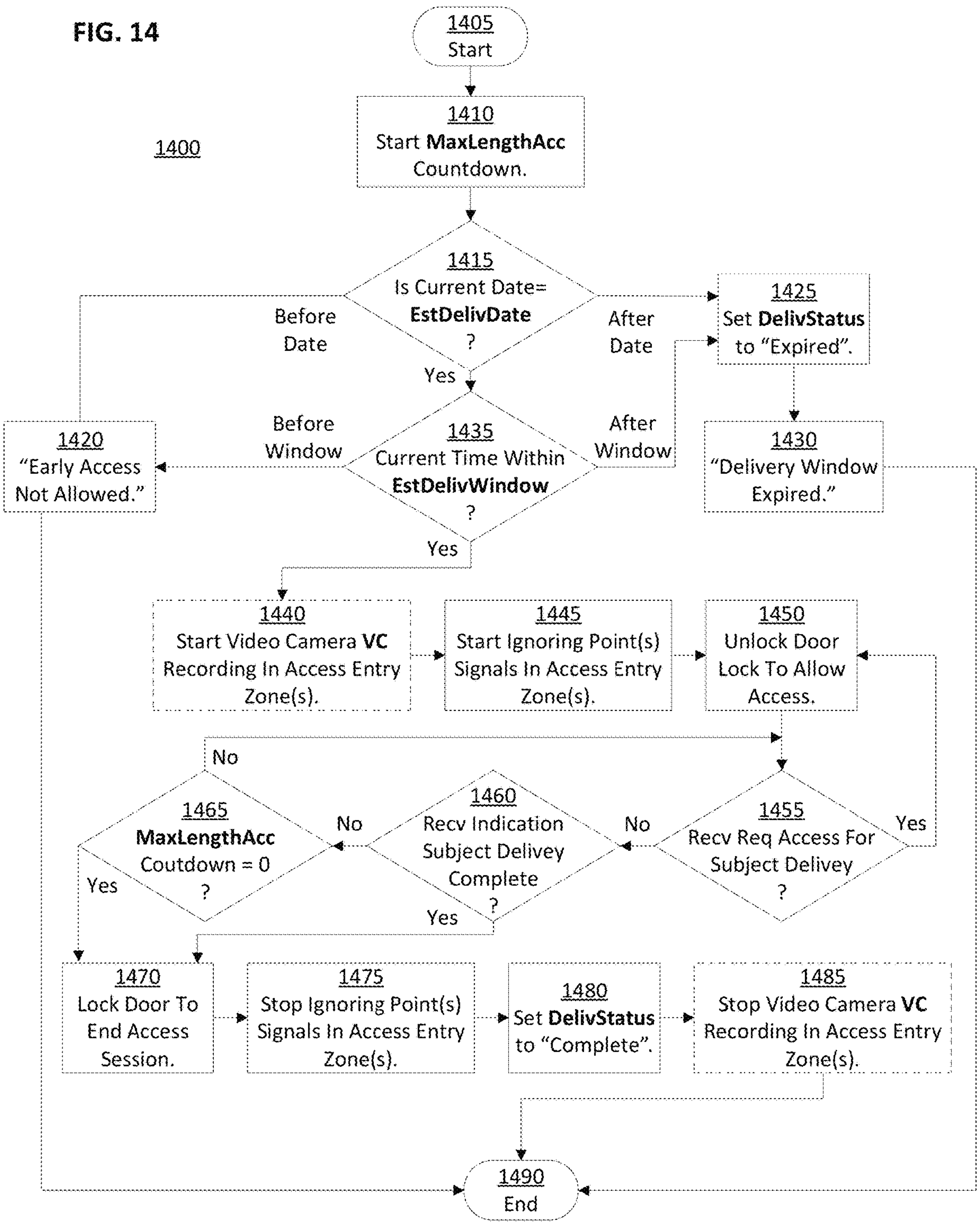

As an example, it is assumed that the FIG. 14 flow 1400, is a preset access plan which the alarm panel 12 set up using data items (e.g., MaxLengthAcc; EstDelivDate; EstDelivWindow) for the subject delivery. After start 1405, a countdown (operation 1410) starting from the maximum time length of access (MaxLengthAcc) is started. FIG. 9's row 954 (corresponding to FIG. 7's row 753) pertaining to Delivery #0009843 will be assumed as the delivery data for the subject delivery. Accordingly, given that FIG. 9's row 954 has a stored data value of "0007" minutes within the MaxLengthAcc column 909, the countdown will start with seven (7) minutes and begin counting down towards zero (0).

In operation 1415, the alarm panel 12 compares a current date (e.g., retrieved from a reliable date/time source on the Internet, or from an alarm panel internal calendar/clock) with the estimated delivery date (EstDelivDate) of the subject delivery to see if the dates are equal (i.e., match). Given that FIG. 9's row 954 has a stored data date value of "20180220" (in YYYYMMDD format) within the EstDelivDate column 905, the current date will be compared against 20180220. In the event that the current date was 20180219 (i.e., one day early), then answering the operation 1415 query of "is Current Date=EstDelivDate?", would result in the "Before Date" flow branch being followed. At operation 1420, an error message such as "Early Access Not Allowed" could be fed back to the delivery company server 60 and/or delivery person device DPD to inform that the temporary access is not yet permitted and the operation ends at 1490. The delivery person DP can attempt access again at a later more appropriate date.

As another example, in the event that the current date was 20180221 (i.e., one day late), then answering the operation 1415 query of "Is Current Date=EstDelivDate?", would result in the "After Date" flow branch being followed. At operation 1425, a database 900's DelivStatus data (row 954, column 904) would be changed to "Expired", and an error message such as "Delivery Window Expired" (operation 1430) could be fed back to the delivery company server 60 and/or delivery person device DPD to inform that the temporary access is no longer permitted. Flow then ends at operation 1490. The delivery company server 60 can then submit revised delivery data to attempt to gain a new estimated delivery date, and the delivery person DP can attempt access again on that new date.

In another example, in the event that the current date was 20180220 (i.e., a correctly matching date), then answering the operation 1415 query of “Is Current Date=EstDelivDate?”, would result in the “Yes” flow branch being followed.

In operation 1435, the alarm panel 12 compares a current time (e.g., retrieved from a reliable date/time source on the Internet, or from an alarm panel internal calendar/clock) with the estimated time-of-day delivery window (EstDelivWindow) of the subject delivery. Given that FIG. 9’s row 954 has a stored data window value of “0900-1200” (in starting to ending HHMM format) within the EstDelivWindow column 906, the current HHMM time will be compared against 0900-1200 to see whether the current time is within that range. In the event that the current time was 0800 (i.e., one hour early), then answering the operation 1435 query of “Is Current Time Within EstDelivWindow?”, would result in the “Before Window” flow branch being followed. At operation 1420, an error message such as “Early Access Not Allowed” could be fed back to the delivery company server 60 and/or delivery person device DPD to inform that the temporary access is not yet permitted. Flow then ends at operation 1490. The delivery person DP can attempt access again at a later more appropriate time.

As another example, in the event that the current time was 800 (i.e., three hours late), then answering the operation 1435 query of “Is Current Time Within EstDelivWindow?”, would result in the “After Window” flow branch being followed. At operation 1425, a database 900’s Deli)/Status data (row 954, column 904) would be changed to “Expired”, and an error message such as “Delivery Window Expired” (operation 1430) could be fed back to the delivery company server 60 and/or delivery person device DPD to inform that the temporary access is no longer permitted. Flow then ends at operation 1490. The delivery company server 60 can then submit revised delivery data to attempt to effect a new estimated delivery estimated time-of-day delivery window (EstDelivWindow), and the delivery person DP can attempt access again within that new window.

In another example, in the event that the current time was 1052 (i.e., a time occurring within the 0900-1200 window), then answering the operation 1435 query of “Is Current Time Within EstDelivWindow?”, would result in the “Yes” flow branch being followed.

At operation 1440, the alarm panel 12 could control the video camera VC (e.g., via the connection 19) to record the scene of the premises’ internal entry area, i.e., at least FIG. 1’s entry ZoneE. Depending on video camera VC positioning, angling, ranging, etc., the recorded scene may also include FIG. 1’s secondary ZoneS, and perhaps a portion of the remainder ZoneR. While video camera VC capabilities/recording may be optional within the alarm system, resultant recordings may prove useful in situations where there is a dispute with the delivery company and/or delivery person DP concerning damage, theft, non-delivery, trespassing, etc. Regarding usage of the recording, a video camera VC real-time feed or a recording may be provided (e.g., via streaming or emailing) to the resident subscriber, so that the subscriber can review the delivery person’s actions and gain peace of mind that the delivery has arrived and was conducted properly (e.g., with respect for the subscriber’s property and privacy).

Next, at operation 1445, the alarm panel 12 may control the alarm system 10 to temporarily disable the alarm system’s ability to recognize an alarm event, i.e., with respect to activities occurring with respect to a predefined. ZoneE sub-area of the premises during the temporary access into the predefined sub-area. As one example, the alarm system may control the alarm system to start ignoring any signals coming from any alarm point(s) (e.g., sensors such as a door trigger switch, motion detector, etc.) within the predetermined access area. (i.e., ZoneE) within the premises. Such effectively allows the delivery person DP to enter the entry ZoneE without resulting in an alarm event, while a remainder of the alarm system remains armed. Accordingly, signals coming from the FIG. 1 alarm points 14A, 14B within the entry ZoneE would be ignored. Ignoring may be accomplished by a simple discarding of signals, masking of the signals, turning off the alarm points such that they do not generate signals, etc. Such ignoring examples are non-limiting and non-exhaustive.

As a further example, the alarm panel may similarly control one or more additional zones. For example, FIG. 1 illustrates a secondary ZoneS. Such secondary ZoneS may be a mud room or coat room, for example, and the resident may wish to have the delivery item(s) left in the mud room or coat room rather than in the entry ZoneE. The alarm panel 12 would be configured to control the alarm system 10 to also start ignoring any signals coming from any alarm point(s) (e.g., sensors such as a door trigger switch, motion detector, etc.) in the secondary ZoneS. Such effectively allows the delivery person DP to enter the secondary ZoneS in addition to the entry ZoneE, without resulting in an alarm event. Accordingly, with the FIG. 1 example, the alarm panel 12 would control the alarm 10 to also start ignoring the signals coming from the alarm point 14C (as well as the points 14A, 14B). Ignoring may be accomplished by a simple discarding of signals, masking of the signals, turning off the alarm points such that they do not generate signals, etc. Such ignoring examples are non-limiting and non-exhaustive.

While the point(s) ignoring effectively allows the delivery person DP to enter the entry ZoneE and/or secondary ZoneS, without resulting in an alarm event, a remainder of the points 14 in the remainder ZoneR of the premises P are not ignored by the alarm system 10. Accordingly, if the delivery person DP travels (i.e., trespasses) beyond the entry ZoneE and/or secondary ZoneS, the alarm system will detect signals from one or more of the remainder points 14, and an alarm event will be generated and reported (e.g., to the premises’ resident, to the police, to the alarm panel company server 50, etc.).

Next, at operation 1450, the alarm panel will control the door lock DL (e.g., via the connection 18) to unlock, to allow the delivery person DP to enter the premises. A delivery person DP may become aware of the unlock via any number of ways, e.g., by hearing the door lock unlock, by an indicator display or (e.g., green) light on the lock, by a “opened” message fed back from the alarm panel 12 and displayed on the delivery person device DPD, etc. The delivery person DP then gains access to an inside of the premises P, theoretically just long enough and far enough into the premises to deposit the delivery item inside the premises. The delivery person DP then theoretically exits the premises closing and locking the door behind him/her.

There may be some delivery instances where it is necessary for a delivery person DP to exit and gain entry to the premises P several times. As one example, assume that the subject delivery is to an apartment within an apartment building, and assume that there are too many delivery items (e.g., packages) for the delivery person DP to transport from the delivery vehicle (e.g., truck) to the apartment in one trip. In such case, the delivery person DP may deposit a first load of items into the apartment, then exit and lock the door to travel back down to the truck for a second load. Upon returning to the apartment door with the second load, the delivery person DP again needs access to the apartment to deposit the second load of items.

The FIG. 14 flow accommodates such situation. More particularly, as long as the conditions are met that the delivery person DP has not provided an indication (e.g., via the delivery person device DPD) that the subject delivery is complete (see No branch of operation 1460) and the countdown from the maximum time length of access (MaxLengthAcc) has not reached zero (0) (see No branch of operation 1465), the FIG. 14 flow will continue looping. To facilitate re-entry, the loop includes an operation 1455 periodically asking whether there has been another access request from the delivery person device DPD. That is, if the answer to the block 1465 query "Recv Reg Access For Subject Delivery?" is No, and if the above-mentioned conditions still remain met, the flow continues looping while the countdown continues. If the answer to the block 1465 query "Recv Reg Access For Subject Delivery?" becomes Yes (e.g., the delivery person DP returns with the second load and issues a new access request from his delivery person device DPD at the apartment door), then flow along the Yes branch leads back to operation 1450 which again unlocks the door.

At some point, the delivery person DP should finish the subject delivery. The delivery person DP would then theoretically lock and close the door manually upon exiting the premise, and would use his/her input device (e.g., hard button, soft button, touch screen, keyboard, etc.) to input a "subject delivery complete" indication (FIG. 10B's operation 1060). At operation 1062, the delivery person device DPD sends the indication to the delivery company server 60. At operation 1064, operations of the delivery person device DPD (with respect to this subject delivery) end. Sending from the delivery person device DPD to the delivery company server 60 again may be accomplished via the delivery company cloud 62 and connections 64, 66.

At FIG. 11's operation 1014, the delivery company server 60 receives and stores (e.g., caches) the "subject delivery complete" (e.g., together with the delivery tracking number (Delivery #)) from the delivery person device DPD, and forwards the same (FIG. 11 operation 1145) to the alarm panel company server 50. At operation 1150, an optional operation of informing a designated recipient (e.g., a homeowner who ordered the delivery item) of the completed subject delivery, may be performed by the delivery company server 60. At operation 1155, operations of the delivery person device DPD (with respect to this subject delivery) end.

Continuing, at FIG. 12's operation 1235, the alarm panel company server 50 receives the subject delivery complete indication (e.g., together with the delivery tracking number (Delivery #)) from the delivery company server 60, and forwards the same (operation 1240) to the alarm panel 12. At operation 1245, operations of the alarm panel company server 50 (with respect to this subject delivery) end.

Upon receipt of the subject delivery complete indication at the alarm panel 12 (e.g., together with the delivery tracking number (Delivery #)), the FIG. 14 operation 1460 "Recv Indication Subject Delivery Complete?" query would result in the Yes branch being followed. At operation 1470, the alarm panel will control the door lock DL (e.g., via the connection 18) to lock, irrespective of any prior manual locking by the delivery person DP. Redundant locking advantageously guarantees that the premises gets locked quickly after completion of the subject delivery, even if the delivery person DP forgets to perform manual locking.

In the event that the delivery person DP never sends the "subject delivery complete" indication and then the countdown from the maximum time length of access (MaxLengthAcc) reaches zero (0), the FIG. 14 operation 1465 "MaxLengthAcc Countdown=0?" query would result in the Yes branch being followed. Again, at operation 1470, the alarm panel will control the door lock DL (e.g., via the connection 18) to lock, irrespective of the "subject delivery complete" indication never having been received. In the event that the delivery person DP simply forgot to send the indication, no harm is created in that the premises gets locked anyways after completion of the subject delivery. In the event that the delivery person DP purposefully did not send the indication with the intent to remain as an unauthorized trespasser within the premises for mischievous purposes, the alarm system will soon address the same.

More particularly, at operation 1475, the alarm panel 12 may control the alarm system 10 to now reenable the alarm system's ability to recognize an alarm event, i.e., with respect to activities occurring in the predefined ZoneE sub-area. As one example, the alarm system may control the alarm system to stop ignoring any signals coming from any alarm point(s) (e.g., sensors such as a door trigger switch, motion detector, etc.) within the entry ZoneE and/or the secondary ZoneS. Such effectively re-alarms entry ZoneE and/or the secondary ZoneS. Stopping of ignoring may be accomplished by no longer discarding signals, masking signals, turning alarm points back on, etc. In the event that the delivery person DP remains within the premise, the alarm system will generate and output an alarm event as soon as the delivery person DP triggers one of the alarm points such as a motion detector.

In operation 1480, the database 900's DelivStatus data (row 954, column 904) would be changed to "Complete".

At operation 1485, the alarm panel 12 could control the video camera VC (e.g., via the connection 19) to stop recording the scene of the premises' internal entry area, i.e., at least FIG. 1's entry ZoneE. Such stoppage may be configured to occur about the same time as the door locking. As another example, the stoppage may be configured to occur at a predetermined delay after the door locking. As another example, stoppage may be hinged to some other type of occurrence. For example, stoppage may be configured to occur after a predetermined amount of time (e.g., 2 minutes) has passed without the reactivated alarm points being triggered. Such delayed stoppage may be advantageous in capturing the scene of a trespassing delivery person DP if he/she triggers an alarm event. Stoppage of video camera VC recording may, in turn, provoke sending of a copy (e.g., via entailing) to the resident subscriber, so that the subscriber can review the recording.

At operation 1490, operations of the alarm panel 12 (with respect to this subject delivery) end and/or operations flow back to the FIG. 13 operation 1340 which likewise ends operations of the alarm panel 12 (with respect to this subject delivery).

The temporary access flow may further contain operations for informing a resident of an impending temporary access, and offering the resident the ability to suddenly block the delivery person's temporary access. For example, assume that the resident arrives back at the residence in time where he/she could actually answer the door manually and physically accept the delivery item from the delivery person.

As one example to allow the resident such option, the display panel may be configured to detect the resident's arrival by the resident keying in to the alarm's keypad to disarm the alarm. The display panel may be further configured to display a message and option choices on a display associated with the keypad. For example, display "Vendor access scheduled. Would you like to block access? Y N." Upon entering ayes response, the temporary access scheduled for that subject delivery would be disabled. Further, when the delivery person DP arrived at the door and entered his/her access request, the display panel may be configured to send a message back to the delivery person device DPD that, "Resident at residence to accept delivery. Ring bell.".

In contrast, if the resident had entered a no response, the scheduled temporary access would be conducted as discussed with respect to FIG. 14's flow 1400, with the exception that the alarm would initially be in a disarmed state, and would remain in a disarmed state. Unlocking and locking of the door, for example, would still occur as planned, so as not to burden the resident with locking and unlocking the door.

While the above example description describes the alarm panel company server 50 serving as an intermediary for, and handling some temporary access operation responsibilities, practice of the invention is not limited therethrough. For example, a main business of the alarm panel company may be in the manufacturing, sale and distribution of alarm panels. Accordingly, the alarm panel company may have little interest in serving as an intermediary for and handling responsibilities for temporary access operations. Instead, the alarm panel company may be happy to delegate such function and responsibilities out to a differing entity which might have monitoring servicing as a main business. As one example, the CMS 20 which already provides alarm monitoring servicing, may also be agreeable to provide the temporary access servicing (e.g., to increase its revenue). With the CMS example, various ones of the above-described alarm panel company server 50 components and operations would simply be shifted over to the CMS server.

As another example, an alarm integrator company (e.g., alarm.com; SecureNet) which already provides various applications (e.g., cell phone apps) and servicing with respect to alarms, may also be agreeable to provide the temporary access servicing. To describe an integrator company example, further shown within FIG. 1 are an integrator company server 70 connected (via a connection 74) to an integrator company cloud 72, which in turn is connected (via a connection 76) to the communicator 30 connected (via the connection 17) to the alarm panel 12. Thus, the combination of the communicator 30 together with the connections 17, 74, 76 and cloud 72, may be utilized to also allow communications between the integrator company server 70 and the alarm panel 12. With the integrator company example, any alarm panel company server 50 components and operations related to the temporary access implementing, would simply be shifted over to the integrator company server 70, and the temporary access responsibilities would be handled by the server 70. That is, the integrator company server 70 would be configured to also offer the subscription service of temporary access handling, in addition to the subscription service of monitoring for alarm applications, etc.

In general, the integrator company server 70 may be a server at a location remote from the premises P or monitored site. It is to be appreciated that the integrator company server 70 may be a single computing device or may be multiple computing devices. The computing devices may be provided at a single location, or distributed at differing locations. For convenience of discussions within this disclosure, however, the integrator company server 70 is referred to as a single device at a single location. The integrator company server 70 may belong to, and be maintained by, an alarm integrator company (e.g., alarm.com; SecureNet).

Further shown in FIG. 1 is the integrator company cloud 72 also being connected (via the connection 78) to the delivery company cloud 62. Thus, the integrator company server 70 and the delivery company server 60 may communicate with each over via the combination of the connections 64, 74, 78 and clouds 62, 72, to allow, for example, communication and cooperation between the integrator company server 70 and the delivery company server 60, to accomplish a temporary access to the premises P. The integrator company server 70 may be further connected to the CMS 20 via connection 79.

Example constructions of the alarm panel 12, computing device 40, central monitoring station 20, communicator device 30, alarm panel company server 50, delivery company server 60 and delivery person device DPD, will now be described more fully with reference to FIGS. 2-6.

Figure 2:
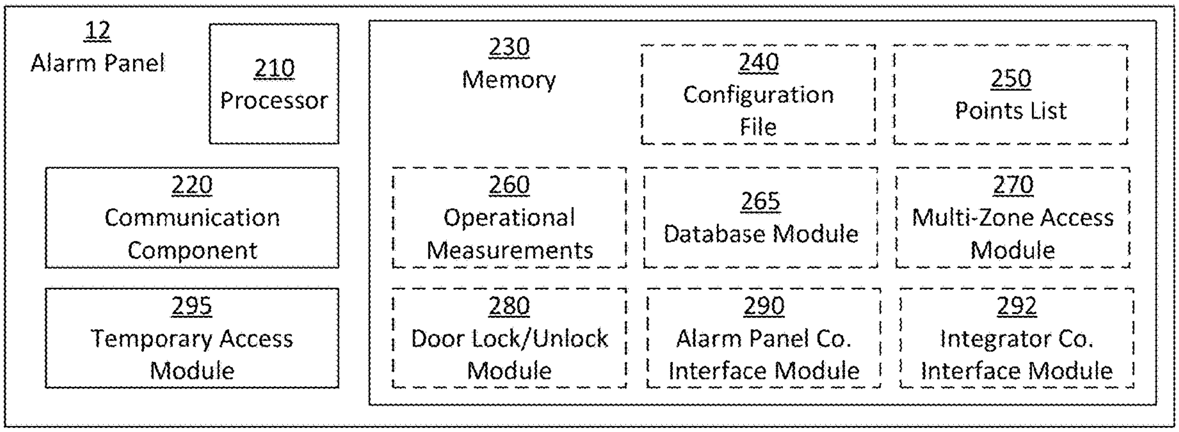
FIGS. 2-6 are block diagrams illustrating example portions of the system shown in FIG. 1 in greater detail.

Turning now to FIG. 2, the alarm panel 12 may include a processor 210, a communication component 220, a memory 230 and a temporary access module 295. The processor 210 can be any microprocessor configured to execute a set of instructions, which when executed, cause the alarm panel 12 to perform a set of actions defined by the instructions. The memory 230 may be any type of computer-readable medium, including non-transient computer-readable medium, such as, for example, EPROM, EEPROM, ROM, FLASH, magnetic storage media, or the like. The communication component 220 may be any device and/or module configured to establish connection to and communication with the points 14, central monitoring station 20, the computing device 40, the communicator 30, alarm panel company server 50, integrator company server 70, door lock DL and video camera VC.

In some examples, the communication component 220 may be a network interface component (e.g., an Ethernet port, a WIFI radio, a Cellular data radio, or the like). In some examples, the connection component 220 may be a packet switched network component (e.g., a telephone modem, a DSL modem, or the like). Such are non-limiting, non-exhaustive examples. Further, the communication component 220 may have plural ports and differing ones of the plural ports may be differing types of ports. For example, there may be two ports, with a first port being an Ethernet port, and a second port being a cellular port. Having plural differing types of ports enables the communication component to facilitate communications with plural apparatus having differing communication capability types, and makes the communications component more versatile.

The memory 230 of the alarm panel 12 may store a configuration file 240 which may be used by the alarm panel 12 during operation. In general, the configuration file 240 indicates the points 14 that are connected to the alarm panel, their type, their status (e.g., active, inactive, or the like), their function, alarm conditions, actions to take if alarm conditions are detected, etc. The configuration file 240 is encoded into a format readable by the alarm panel 12, and is therefore not necessarily human-readable. The format may differ depending upon the type of alarm panel, the manufacturer of the alarm panel, the model of the alarm panel, etc. The memory 230 may also store a zone or points list 250. The zone or points list 250 may include a listing of the points 14 installed in the alarm system 10, and include data related to each point 14. In some examples, the zone or points list 250 may include a model identification corresponding to the points 14 represented in the points list 250.

During operation of the alarm system 10, the alarm panel 12 records various quantitative measurements and stores them in the memory 230 as operational measurements 260. As an example, the operational measurements 260 may include measurements of the wireless connectivity level of one or more of the points 14. As another example, the operational alert may include a measurement of the cellular connectivity level of the alarm panel 12. The above example measurements are provided for clarity of presentation, but are not intended to be limiting or exhaustive.

The alarm panel 12 may communicate the operational measurements 260 (e.g., in real time, periodically, in groups, or the like) to the central monitoring station 20 for purposes of keeping the central monitoring station informed regarding a status of, and instances occurring on, the alarm system 10. As a brief non-limiting, non-exhaustive example, the system 10 may be configured to monitor pressure in, for example, a tire, a vessel, a tank, a storage container, or the like. During operation, the panel 12 may record various quantitate measurements of the pressure inside the monitored vessel. Such measurements may be periodically transmitted to the central monitoring station 20. The central monitoring station 20 may use the operational measurements to "predict" future pressure conditions. For example, if the pressure is continually declining, the central station 20 may determine that a leak exists even if the pressure has not fallen below a critical level, and institute some type of alarm procedure.

Next, a database module 265 stores, for example, a database (discussed elsewhere in this disclosure) having data related to temporary access requests and operations. A multi-zone access module 270 stores, for example, data defining plural temporary access zones and any temporary access routines related thereto (e.g., turning off select points, or ignoring signals from select points). Door lock/unlock module 280 stores, for example, data and routines related to communicating with and controlling a door and/or door lock used in connection with temporary access operations. Finally, alarm panel company interface module 290 and integrator company interface module 292 store, for example, data, routines, etc., used in connection with interfacing with the alarm panel company server 50 and/or integrator company server 70 in connection with temporary access requests and operations.

In finishing up FIG. 2, temporary access module 295 may contain, for example, set of instructions, which when executed, cause the alarm panel 12 to perform a set of temporary access actions defined by the instructions. The temporary access module 295 may access various data and routines stored within the various aforementioned memory 230 items, for helping perform temporary access actions.

Figure 3:
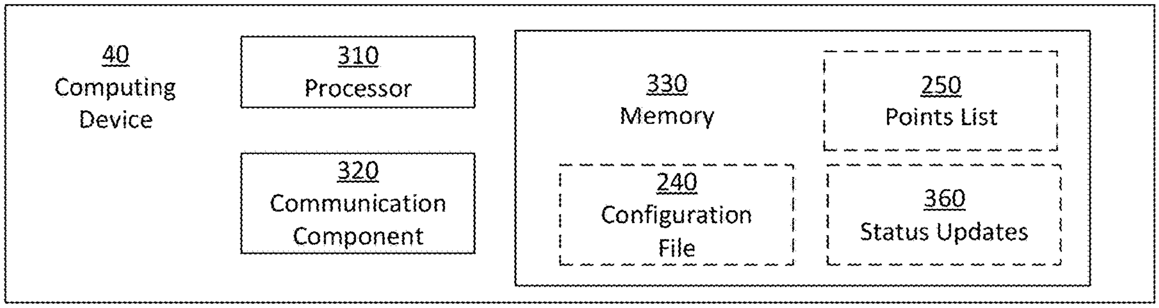

Turning now to FIG. 3, the computing device 40 may include a processor 310, a communication (e.g., connection) component 320, and a memory 330. The processor 310 can be any microprocessor configured to execute a set of instructions, which when executed, cause the computing device 40 to perform a set of actions defined by the instructions. The memory 330 may be any type of computer-readable medium, including non-transient computer-readable medium, such as, for example, EPROM, EEPROM, ROM, FLASH, magnetic storage media, or the like.

The communication component 320 may be any device and/or module configured to establish communication with the alarm panel 12 and/or the central monitoring station 20. In general, the communication component 320 may be configured to establish a wireless or a wired communication link with the alarm panel 12 for purposes of configuring the alarm panel, updating the configuration of the alarm panel, or performing maintenance on the alarm panel. Additionally, the communication component 320 may be configured to establish a wireless or a wired communication link with the central monitoring station 20 for purposes of transmitting data (e.g., points, status updates, or the like) from the computing device 40 to the central monitoring station 20.

In some examples, the communication component 320 may be a network interface component (e.g., an Ethernet port, a WIFI radio, a Cellular radio, or the like). Further, the communication component 320 may have plural ports and differing ones of the plural ports may be differing types of ports. For example, there may be two ports, with a first port being an Ethernet port, and a second port being a cellular port. Having plural differing types of ports enables the communication component to facilitate communications with plural apparatus having differing communication capability types, and makes the communication component more versatile.

The memory 330 of the computing device 40 may store zone or points list 250, configuration file 240 and status updates 360. The zone or points list 250 may be a copy of the zone or points list stored in the alarm panel 12. The configuration file 240 may include various characteristics of the points 14 represented in the points list 250. In general, the status updates may include any quantitative data regarding the measurements from a device in the system, as well as the detailed information (e.g., the firmware, software, hardware, or the like) about the device. Additionally, the status updates 360 may include status updates corresponding to the points 14 or updated coding (e.g., firmware, software) for controlling an operation of the alarm system. For example, the status updates 360 may include measurements of the battery level of one or more points 14.

The zone or points list 250 and the status updates 360 may be communicated to the central monitoring station 20 during an initial installation, configuration, or maintenance operation of the alarm system 10 for purposes of the central monitoring station 20 determining maintenance needs, validating installation and/or updating of the alarm system 10.

Figure 4:
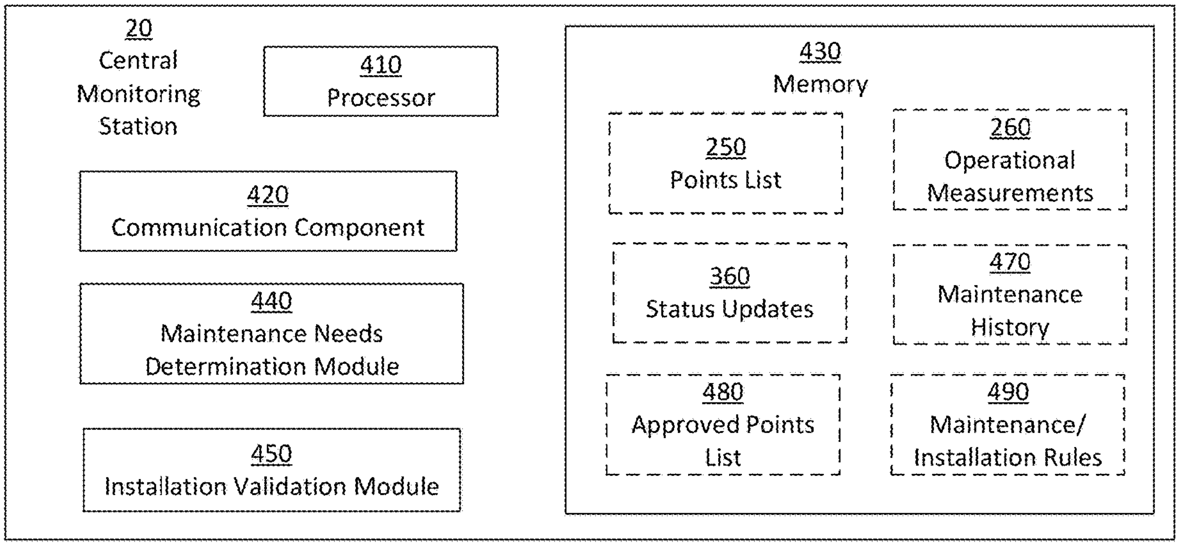

Turning next to FIG. 4, the central monitoring station 20 may include a processor 410, a communication component 420, a memory 430, a maintenance needs determination module 440, and an installation validation module 450. The processor 410 can be any microprocessor configured to execute a set of instructions, which when executed, cause the central monitoring station 20 to perform a set of actions defined by the instructions. Furthermore, the memory 430 may be any type of computer-readable medium, including non-transient computer-readable medium, such as, for example, EPROM, EEPROM, ROM, FLASH, magnetic storage media, or the like.

The communication component 420 enables the central monitoring station 20 to connect to the alarm panel 12, communicator 30, computing device 40, alarm panel company server 50 and/or integrator company server 70. As an example, the communication component 420 may enable the central monitoring station 20 to connect to the alarm panel company server 50 for purposes of transmitting data (e.g., zone or points list 250, status updates, alarm events or the like) from the central monitoring station 20 to the alarm panel company server 50, and for receiving requests from the alarm panel company server 50.

In some examples, the communication component may be an Ethernet port, or the like, thus enabling the central monitoring station 20 to be accessible via the Internet. In other non-exhaustive, non-limiting examples, the communication component may be universal serial bus (USB), wireless and/or cellular communication ports. Further, the communication component may have plural ports and differing ones of the plural ports may be differing types of ports. For example, there may be two ports, with a first port being an Ethernet port, and a second port being a cellular port. Having plural differing types of ports enables the communication component to facilitate communications with plural apparatus having differing communication capability types, and makes the communication component more versatile.

The memory 430 of the central monitoring station 20 may store the zone or points list 250, the operational measurements 260, status updates 360, maintenance history 470, approved pints list 480 and maintenance/installation rules 490. As described above, the zone or points list 250, the operational measurements 260 and status updates 360 may be received from the alarm panel 12 and/or the computing device 40 during operation of the alarm system 10 and/or during installation, configuration, maintenance and/or updating of the alarm system 10.

The maintenance history 470 may include maintenance operations performed thus far on the alarm system 10. The approved points list 480 may include a listing of commercially-available points e.g., type, manufacturer, model number, or the like) that are approved for installation in the alarm system 10. With some examples, a monitoring company responsible for maintenance of the alarm system 10 may provide the approved points list to ensure that the alarm system 10 is installed according to desired standards. The maintenance and installation rules 490 may include a variety of rules related to making determinations about maintenance needs and installation of the alarm system 10.

In continuing the FIG. 4 discussions, the maintenance needs operation module 440 may determine a maintenance need of the alarm system based at least in part on the plurality of operational measurements 260, the maintenance history 470, and the maintenance and installation rules 490. In general, the installation validation module 450 may validate the installation of the alarm system 10 based at least in part on the zone or points list 250, the status updates 360, the approved points list 480, and the maintenance and installation rules 490.

Figure 5:
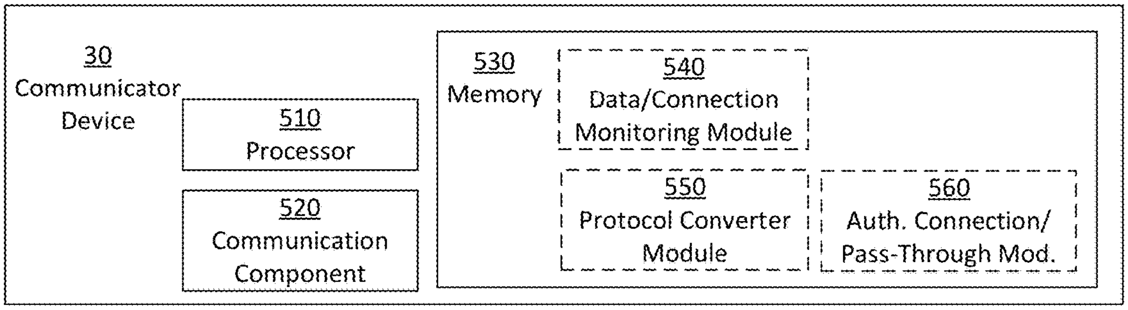

Referring now to FIG. 5, the communicator device 30 may include a processor 510, a communication (e.g., connection) component 520 and a memory 530. The processor 510 can be any microprocessor configured to execute a set of instructions, which when executed, cause the communicator device 30 to perform a set of actions defined by the instructions. The memory 530 may be any type of computer-readable medium, including non-transient computer-readable medium, such as, for example, EPROM, EEPROM, ROM, FLASH, magnetic storage media, or the like.

The communication component 520 may be any device and/or module configured to establish communications with the alarm panel 12, the central monitoring station 20, the alarm panel company server 50 and/or the integrator company server 70. In general, the communication component 520 may be configured to establish a wireless or a wired communication link with any of such components for purposes of exchanging data, requests, commands, etc.

In some examples, the communication component 520 may be a network interface component (e.g., an Ethernet port, a WWI radio, a Cellular radio, or the like). In other non-exhaustive, non-limiting examples, the communication component may have universal serial bus (USB), wireless and/or cellular communication ports. Further, the communication component may have plural ports and differing ones of the plural ports may be differing types of ports. For example, there may be three ports, with a first port being an USB port, and second and third ports each being a cellular port. Having plural ports of differing types enables the communication component to facilitate communications with plural apparatus having differing communication capability types, and makes the communication component more versatile.

The memory 530 of the communicator device 30 may store a data/connection monitoring module 540, a protocol converter module 550, and an authorized connection pass-through module 560. The data/connection monitoring module 540 is configured to monitor (see FIG. 1 dashed line 32) for failures in communications between the alarm panel 12 and the central monitoring station 20 along the connection 15. That is, the module may encompass coding (e.g., firmware, software, etc.) configured to provide a set of instructions, which when executed by the processor (and together with other hardware), cause the communicator device 30 to perform a set of data/connection monitoring actions defined by the instructions.

At times, the communicator device 30 may pass data between the components to which it connects. Data may be received via a first type of protocol, whereas data output by (e.g., passed through) the communicator device 30 may be via a second (differing) type of protocol. For example, data received via monitoring of the connection 15 (e.g., a POTS line) may be analog data, whereas data outputted on the connection 34 (e.g., an Ethernet line) to the central monitoring station 20 may be digital data, or output on the connection 76 (e.g., a cellular channel) may be cellular data. The protocol converter module 550 is configured to provide conversion of data from one protocol to another as needed. That is, the module may encompass coding (e.g., firmware, software, etc.) configured to provide a set of instructions, which when executed by the processor (and together with other hardware), cause the communicator device 30 to perform a set of protocol conversion actions defined by the instructions.

The authorized connection/pass-through module 560 may include data defining which entities are authorized to use the communicator device 30 for communications, and which types of data, requests, etc. should be passed therethrough. For example, control if/when to forward data received via monitoring of the connection 15 or received via connection 17 from the alarm panel 12, onward to the central monitoring station 20. For example, control to not forward such data to the central monitoring station 20 when the communicator device 30 is operating in a passive mode, and control to forward such data to the central monitoring station 20 when the communicator device 30 is operating in an active mode. That is, the module may encompass coding (e.g., firmware, software, etc.) configured to provide a set of instructions, which when executed by the processor (and together with other hardware), cause the communicator device 30 to perform a set of authorization monitoring, data pass-through control, etc. actions defined by the instructions.

Figure 6:
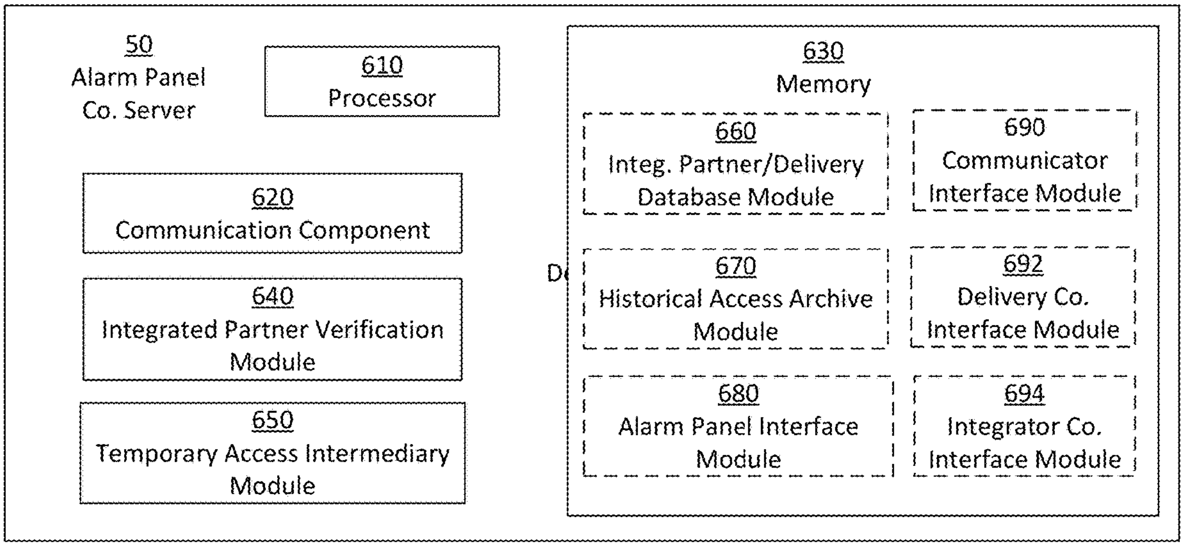

Referring now to FIG. 6, the alarm panel company server 50 includes a processor 610, a communication (e.g., connection) component 620, a memory 630, an integrated partner verification module 640 and a temporary access intermediary module 650. The processor 610 can be any microprocessor configured to execute a set of instructions, which when executed, cause the alarm panel company server 50 to perform a set of actions defined by the instructions. The memory 630 may be any type of computer-readable medium, including non-transient computer-readable medium, such as, for example, EPROM, EEPROM, ROM, FLASH, magnetic storage media, or the like.

The communication component 620 may be any device and/or module configured to establish communications with the communicator 30, the central monitoring station 20, the delivery company server 60 and/or the integrator company 70. In general, the communication component 620 may be configured to establish a wireless or a wired communication link with any of such components for purposes of exchanging data, requests, commands, etc.

In some examples, the communication component 620 may be a network interface component (e.g., an Ethernet port, a WIFI radio, a Cellular radio, or the like). In other non-exhaustive, non-limiting examples, the communication component may have universal serial bus (USB), wireless and/or cellular communication ports. Further, the communication component may have plural ports and differing ones of the plural ports may be differing types of ports. For example, there may be two ports, with a first port being an Ethernet port, and a second port being a cellular port. Having plural ports of differing types enables the communication component to facilitate communications with plural apparatus having differing communication capability types, and makes the communication component more versatile.

The memory 630 of the alarm panel company server 50 may store an integrated partner/delivery database module 660, a historical access archive module 670, an alarm panel interface module 680, a communicator interface module 690, a delivery company interface module 692 and an integrator company interface module 694.

The integrated partner/delivery database module 660 stores, for example, information detailing integrated partners (e.g., integrator companies; delivery companies; etc.) having a business, contractual or other relationship with the alarm company for the temporary access services. Further, the module 660 stores the subscriber and/or delivery data database (discussed elsewhere in this disclosure). The historical access archive module 670 may store a historical record of each delivery and/or temporary access communication handled by the alarm panel company server 50.

The alarm panel interface module 680, communicator interface module 690, delivery company interface module 692 and integrator company interface module 694 may store, for example, data, routines, etc., used in connection with interfacing with the alarm panel 12, communicator 30, delivery company server 60 and/or integrator company server 70 in connection with temporary access requests and operations.

In continuing FIG. 6 discussions, the integrated partner verification module 640 may contain, for example, set of instructions, which when executed, cause the alarm panel company server 50 to perform a set of integrated partner verification actions defined by the instructions. For example, verifying that a delivery company communicating with the alarm panel company server 50 is a subscriber to its temporary access services. The integrated partner verification module 640 may access various data and routines stored within the various aforementioned memory 630 items, for helping perform the integrated partner verification actions.

Likewise, the temporary access intermediary module 650 may contain, for example, set of instructions, which when executed, cause the alarm panel company server 50 to perform a set of temporary access intermediary actions defined by the instructions. For example, allowing the alarm panel company server 50 to act as an intermediary for handling communications between the delivery company server 60 and the alarm panel 12. The temporary access intermediary module 650 may access various data and routines stored within the various aforementioned memory 630 items, for helping perform the temporary access intermediary actions.

The foregoing illustrative examples are given for purposes of completeness and clarity, but are not intended to be limiting. It is to be appreciated, that a variety of different example implementations of the above described systems and methods may exist. These various examples may depend upon the particular alarm system, the monitoring service, the operator, the alarm system, or other conditions and standards. As such, other implementations and examples not disclosed herein are possible without departing from the sprit and scope of the claimed subject matter.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The various embodiments or components described above, for example, the alarm panel, the central monitoring station, the computing device, the communicator, the alarm panel company server, the delivery company server, the integrator company server, and the components or processors therein, may be implemented as part of one or more computer systems. Such a computer system may include a computer, an input device, a display unit and an interface, for example, for accessing the Internet. The computer may include a microprocessor. The microprocessor may be connected to a communication bus. The computer may also include memories. The memories may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system. As used herein, the term "software" includes any computer program stored in memory for execution by a computer, such memory including RAM memory, ROM memory, EPROM memory, EEPROM memory, and non-volatile RAM (NVRAM) memory. The above memory types are exemplary only, and are thus not limiting as to the types of memory usable for storage of a computer program.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A system for controlling access, comprising:

a memory; and a processor connected to the memory and configured to:

store temporary access information for an entity, wherein the temporary access information identifies a time window defining a beginning time and an ending time for an allowed temporary access to a remotely controllable lockable door;

receive an access request from the entity to access the remotely controllable lockable door;

determine whether the access request is received after the beginning time and prior to the ending time of the time window for the allowed temporary access; and unlock the remotely controllable lockable door in response to the access request being received after the beginning time and prior to the ending time of the time window for the allowed temporary access.

2. The system of claim 1, wherein the processor is further configured to:

transmit a message that the allowed temporary access is not permitted in response to the access request being received prior to the beginning time or subsequent to the ending time of the time window for the allowed temporary access.

3. The system of claim 1, wherein the processor is further configured to store an identifier associated with the entity, and wherein the processor is further configured to unlock the remotely controllable lockable door in response to the access request being associated with the identifier.

4. The system of claim 1, wherein the remotely controllable lockable door is associated with a secured zone of an alarm system, and wherein the processor is further configured to temporarily disable recognition by the alarm system of an alarm event associated with the secured zone during the allowed temporary access.

5. The system of claim 1, wherein the processor is further configured to control a camera monitoring an area associated with the remotely controllable lockable door to record one or more images of the area in response to the access request being received after the beginning time and prior to the ending time of the time window for the allowed temporary access.

6. The system of claim 1, wherein the processor is further configured to store an identifier associated with the entity, and wherein the processor is further configured to unlock the remotely controllable lockable door in response to the access request being associated with the identifier and being received after the beginning time and prior to the ending time of the time window for the allowed temporary access.

7. A method of controlling access, comprising:

storing temporary access information for an entity, wherein the temporary access information identifies a time window defining a beginning time and an ending time for an allowed temporary access to a remotely controllable lockable door;

receiving an access request from the entity to access the remotely controllable lockable door;

determining whether the access request is received after the beginning time and prior to the ending time of the time window for the allowed temporary access; and unlocking the remotely controllable lockable door in response to the access request being received after the beginning time and prior to the ending time of the time window for the allowed temporary access.

8. The method of claim 7, further comprising:

transmitting a message that the allowed temporary access is not permitted in response to the access request being received prior to the beginning time or subsequent to the ending time of the time window for the allowed temporary access.

9. The method of claim 7, further comprising:

storing an identifier associated with the entity;

wherein unlocking the remotely controllable lockable door is further in response to the access request being associated with the identifier.

10. The method of claim 7, wherein the remotely controllable lockable door is associated with a secured zone of an alarm system, and further comprising:

temporarily disabling recognition by the alarm system of an alarm event associated with the secured zone during the allowed temporary access.

11. The method of claim 7, further comprising:

controlling a camera monitoring an area associated with the remotely controllable lockable door to record one or more images of the area in response to the access request being received after the beginning time and prior to the ending time of the time window for the allowed temporary access.

12. The method of claim 7, further comprising:

storing an identifier associated with the entity;

wherein unlocking the remotely controllable lockable door is further in response to the access request being associated with the identifier and being received after the beginning time and prior to the ending time of the time window for the allowed temporary access.

13. A non-transitory computer-readable medium having stored instructions for controlling access, wherein the instructions are executable by at least one processor to:

store temporary access information for an entity, wherein the temporary access information identifies a time window defining a beginning time and an ending time for an allowed temporary access to a remotely controllable lockable door;

receive an access request from the entity to access the remotely controllable lockable door;

determine whether the access request is received after the beginning time and prior to the ending time of the time window for the allowed temporary access; and unlock the remotely controllable lockable door in response to the access request being received after the beginning time and prior to the ending time of the time window for the allowed temporary access.

14. The non-transitory computer-readable medium of claim 13, wherein the instructions are further executable to:

transmit a message that the allowed temporary access is not permitted in response to the access request being received prior to the beginning time or subsequent to the ending time of the time window for the allowed temporary access.

15. The non-transitory computer-readable medium of claim 13, wherein the instructions are further executable to:

store an identifier associated with the entity; and unlock the remotely controllable lockable door further in response to the access request being associated with the identifier.

* * * * *